US010572897B2

(12) United States Patent
Kurian et al.

(10) Patent No.: US 10,572,897 B2
(45) Date of Patent: Feb. 25, 2020

(54) CONTEXTUAL DISCOVERY

(71) Applicant: KEYPOINT TECHNOLOGIES INDIA PVT. LTD., Hyderabad (IN)

(72) Inventors: Prima Dona Kurian, Hyderabad (IN); Sumit Goswami, Hyderabad (IN); Sunil Motaparti, Hyderabad (IN)

(73) Assignee: Keypoint Technologies India Pvt. Ltd., Hyderabad (IN)

( * ) Notice: Subject to any disclaimer, the term of this patent is extended or adjusted under 35 U.S.C. 154(b) by 194 days.

(21) Appl. No.: 14/775,033

(22) PCT Filed: Mar. 10, 2014

(86) PCT No.: PCT/IN2014/000155
§ 371 (c)(1),
(2) Date: Sep. 11, 2015

(87) PCT Pub. No.: WO2014/141300
PCT Pub. Date: Sep. 18, 2014

(65) Prior Publication Data
US 2016/0027045 A1 Jan. 28, 2016

(30) Foreign Application Priority Data
Mar. 11, 2013 (IN) .......................... 1023/CHE/2013

(51) Int. Cl.
*G06Q 30/02* (2012.01)
*G06F 16/9535* (2019.01)
(Continued)

(52) U.S. Cl.
CPC ... *G06Q 30/0251* (2013.01); *G06F 16/24575* (2019.01); *G06F 16/9535* (2019.01); *G06Q 30/00* (2013.01); *G06Q 30/0255* (2013.01)

(58) Field of Classification Search
CPC ........................................ G06Q 30/0207–0277
(Continued)

(56) References Cited

U.S. PATENT DOCUMENTS 9,026,516 B1 * 5/2015 Chapin ............... G06F 16/9537
707/706
2002/0083056 A1 * 6/2002 Armstrong ........ G06F 17/30362
(Continued)

OTHER PUBLICATIONS

Socio-Semantic Conversational Information, Saurav Sahay, Dec. 2011 (Year: 2011).*

Primary Examiner — Gautam Ubale
(74) *Attorney, Agent, or Firm* — Benesch, Friedlander, Coplan & Aronoff LLP

(57) ABSTRACT

A contextual discovery application is presented. The contextual discovery application is adapted to be executed on a computing device, wherein the computing device is a client in a client-server environment and the contextual discovery application on execution enables a processing unit to receive a set of information from a data acquisition unit on the computing device and to process the set of information to identify a contextual information from the set of information, to receive one or more advertisements from a database related to the contextual information, and it renders the advertisement on a display unit of the computing device in a real-time. The data acquisition unit acquires the set of information from at least one application currently running or previously running on the computing device. Embodiments including a computing device and system and methods for facilitating contextual discovery are also presented.

21 Claims, 10 Drawing Sheets

(51) Int. Cl.
 *G06F 16/2457* (2019.01)
 *G06Q 30/00* (2012.01)
(58) Field of Classification Search
 USPC .......................................................... 705/14
 See application file for complete search history.

(56) References Cited

U.S. PATENT DOCUMENTS

| | | | | |
|---|---|---|---|---|
| 2005/0144069 A1* | 6/2005 | Wiseman | ................ | G06Q 30/02 705/14.41 |
| 2006/0294189 A1* | 12/2006 | Natarajan | ................ | H04L 51/04 709/206 |
| 2009/0068991 A1* | 3/2009 | Aaltonen | ................ | G06Q 30/02 455/412.1 |
| 2009/0089141 A1* | 4/2009 | Lara | ................... | G06Q 30/0244 705/14.43 |
| 2009/0240677 A1* | 9/2009 | Parekh | .............. | G06F 17/30867 |
| 2010/0036914 A1 | 2/2010 | Chesta | | |
| 2010/0063882 A1* | 3/2010 | Danieli | ................. | G06Q 30/02 705/14.61 |
| 2010/0138452 A1* | 6/2010 | Henkin | ................ | G06Q 30/02 707/803 |
| 2010/0279667 A1* | 11/2010 | Wehrs | .................... | G06Q 30/02 455/414.1 |
| 2011/0055017 A1* | 3/2011 | Solomon | ................ | G06Q 30/02 705/14.66 |
| 2011/0282964 A1* | 11/2011 | Krishnaswamy | ...... | G06Q 30/02 709/217 |
| 2011/0320273 A1* | 12/2011 | Miranda-Steiner | .... | G06Q 30/02 705/14.49 |
| 2012/0023393 A1* | 1/2012 | Tomasic | ................ | G06F 3/0481 715/224 |
| 2012/0101903 A1* | 4/2012 | Oh | ..................... | G06Q 30/0269 705/14.66 |
| 2012/0158511 A1* | 6/2012 | Lucero | ............... | G06Q 30/0251 705/14.64 |
| 2012/0290392 A1* | 11/2012 | Joshi | ...................... | G06Q 30/02 705/14.53 |
| 2013/0073546 A1* | 3/2013 | Yan | ................... | G06F 17/30867 707/732 |
| 2014/0129951 A1* | 5/2014 | Amin | ..................... | G06Q 50/30 715/738 |
| 2014/0172892 A1* | 6/2014 | Schechter | ......... | G06F 17/30386 707/758 |
| 2014/0214545 A1* | 7/2014 | Zhang | ................ | G06Q 30/0267 705/14.64 |
| 2014/0244766 A1* | 8/2014 | Mo | ......................... | G06F 9/541 709/206 |

* cited by examiner

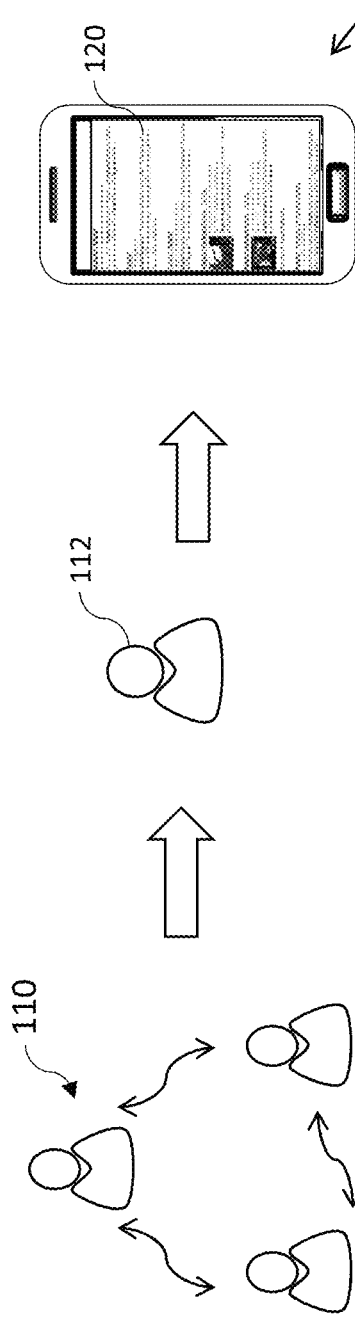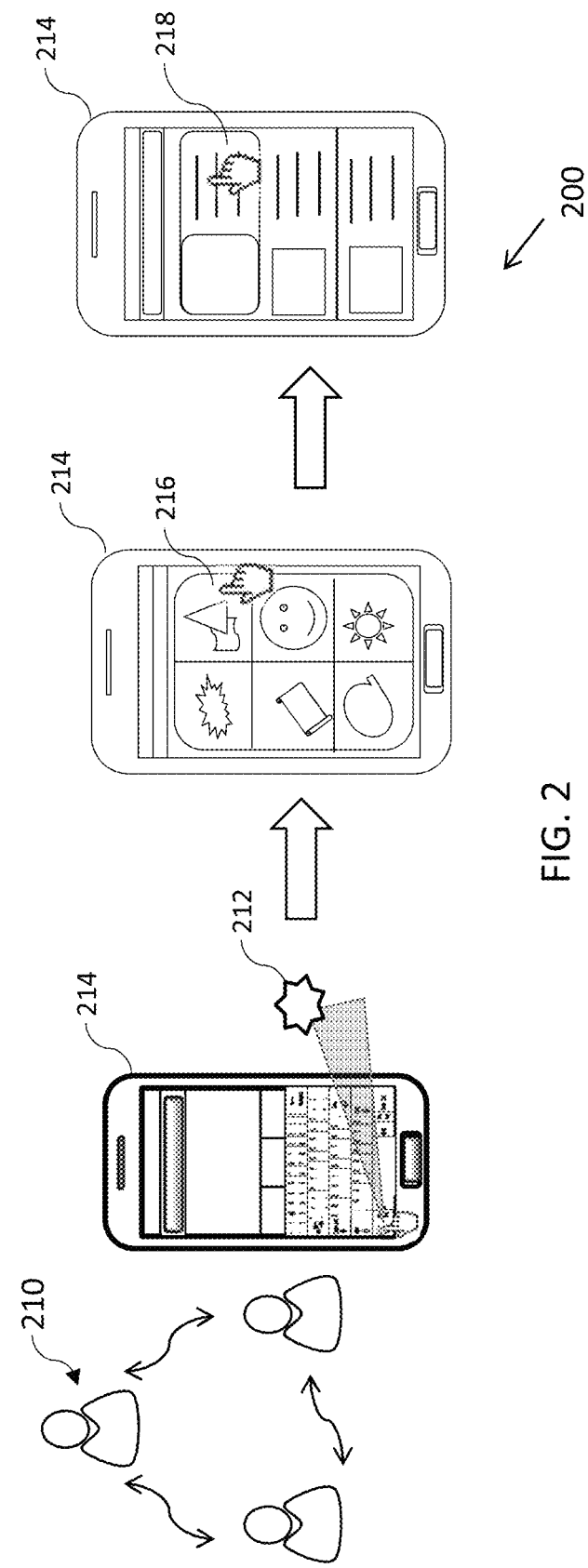

CONTEXTUAL DISCOVERY

RELATED APPLICATION DATA

This application is the National Stage entry of International Application No. PCT/IN2014/000155, filed Mar. 10, 2014, which claims priority to Indian Patent Application No. 1023/CHE/2013, filed Mar. 11, 2013, both of which are incorporated herein in their entirety by reference thereto.

FIELD OF THE INVENTION

The present invention generally relates to contextual discovery. More particularly, the invention relates to providing advertisements on a client device based on contextual discovery.

BACKGROUND OF THE INVENTION

Over the past decade, the growth of Internet technology has provided an important source of communication and information exchange to individuals and businesses. Various web based services have evolved over time, through which vendors can advertise and sell products directly to potential clients. To attract potential consumers, however, the businesses require advertising. One of the most common and conventional advertising techniques applied on the Internet is to provide advertising promotions on the web pages of another websites which directs the end user to the advertiser's site when the advertising promotion is selected by the end user. However, the process of including such advertising promotions to the websites is expensive for the advertisers. Moreover, conventional on-line marketing and advertising techniques are often limited in their ability to provide contextually relevant information to the end-users.

Alternatively, users may search relevant content from the vast resources of information available on the internet. For example, when a user wishes to buy a product or avail of any services, then the user may search for said products or services using the internet resources. However, accessing the web content for searching and shortlisting a relevant service or product is time consuming for the end-user. In addition, searching for a requisite product or service on the internet exposes the user to security and privacy related issues, and should be avoided.

SUMMARY OF THE INVENTION

According to an embodiment of the invention, a contextual discovery application is executed on a computing device, wherein the computing device is a client in a client-server environment and the contextual discovery application on execution enables a processing unit to receive a set of information from a data acquisition unit on the computing device and to process the set of information to identify a contextual information from the set of information, to receive one or more advertisements from a database related to the contextual information, and it renders the advertisement on a display unit of the computing device in a real-time. The data acquisition unit acquires the set of information from at least one application currently running or previously running on the computing device.

The contextual information comprises a semantic sense derived by processing the set of information and a lexicon displayed on the application running on the computing device. The lexicon defines one or more words which in combination convey a meaningful message, and if multiple advertisements relate to the same contextual information, the advertisements are displayed on the display unit according to at least one of a computing device ranking and a server ranking. The computing device ranking is based on the set of information, and the server ranking is based on at least one of a form data filled out by a category of user while uploading the advertisement, and analytic information which is collected by the processing unit.

According to another embodiment of the invention, the contextual discovery application further includes a user control which enables a controlled access to the one or more applications running on the computing device.

According to yet another embodiment of the contextual discovery application, the set of information comprises a user preference on viewing of advertisements, personal demographics of the user of the computing device, an instant messenger (IM) application usage, a location based information of the computing device at one or more instances, a mood and/or sentiment based information derived by processing the lexicon displayed on the display unit.

According to one embodiment of the contextual discovery application, the computing device ranking for the advertisement is based on the server ranking of the advertisement.

According to another embodiment of the contextual discovery application, the computing device includes an information database which stores at least the set of information and the contextual information. The processing unit which renders the advertisement based on at least the set of information and the contextual information stored in the information database.

According to yet another embodiment of the contextual discovery application, the computing device ranking is based on temporal information and/or a geographic location of the computing device.

According to one embodiment of the contextual discovery application, at least one of the computing device ranking and the server ranking is based on metadata information of at least one of the computing device or an application to which the contextual discovery application is plugged into.

According to another embodiment of the contextual discovery application, the contextual discovery application includes a first grid which displays the advertisement related to the contextual information on the display unit on receiving a first user input. In a case where multiple advertisements relate to same contextual information, the advertisements are displayed on the first grid according to at least one of the computing device ranking and the server ranking. The computing device ranking for the advertisement depends on the first user input for the same advertisement over the first grid. It can also depend on a frequency of the first user input for the same advertisement over the first grid.

According to yet another embodiment of the contextual discovery application, the contextual discovery application also includes a second grid which displays one or more subservices related to the advertisement and the subservices are displayed on the second grid when the first user input is received on the first grid.

According to one embodiment of the contextual discovery application, the set of information of the contextual discovery application is acquired by the data acquisition unit from at least one of a web application, a mobile application, and a desktop application. The web application is any of an email client, a chat client, a web page, a widget, a search engine or an applet, and the mobile application is any of a homescreen, a web browser, an email client, a chat client, a web page, or an applet.

According to another embodiment of the contextual discovery application, the contextual discovery application can also be integrated as a plug-in into any of the web application, the mobile application, the desktop application, a home-screen application, and a widget application.

A context-sensitive widget enables a text input on the home-screen application which facilitates identification of the contextual information based on at least a time context, a location context, a profile context, content being consumed on the computing device, content being created on the device and text input analytics from the text input received from the context sensitive widget. The processing unit receives the advertisement from the database, and renders the advertisement on a home-screen of the home-screen application being displayed on the display unit of the computing device in real-time.

According to yet another embodiment of the contextual discovery application, the computing device including the contextual discovery application also includes at least one of a recent database and a historical database, wherein the recent database stores at least a recent set of information acquired by the data acquisition unit in a recent time frame from one or more applications running on the computing device during the recent time frame, and a recent contextual information identified by the processing unit from the recent information. The historical database stores at least a historical set of information acquired by the data acquisition unit before the recent time frame from the one or more applications running on the computing device before the recent time frame and the historical contextual information identified by the processing unit from the historical information. The processing unit of the computing device receives at least one of the recent set of information and the recent contextual information from the recent database, the historical set of information and the historical contextual information from the historical database, identifies the contextual information from at least one of the recent set of information, the recent contextual information, the historical set of information and the historical contextual information, receives the advertisement from a database related to said contextual information, and renders the advertisement on the home-screen of the home-screen application being displayed on the display unit of the computing device in real-time. It may further be noted that the advertisement is rendered even if the user has not entered anything on the home-screen widget.

According to one embodiment of the contextual discovery application, the processing unit of the computing device processes the word based on semantics, predicts probable contextual information related to the word and receives one or more advertisements from the database related to said contextual information, and renders the advertisement on a display unit of the computing device in real-time.

According to another embodiment of the contextual discovery application, the contextual discovery application further includes a contextual discovery key which comprises an indicator on the keypad to provide an indication on presence of the contextual information, wherein the third user input to the contextual discovery key renders the advertisement. It may be noted that the contextual information is derived by processing the information, which may be a historical information or current information, including deriving the contextual information from the words currently typed or previously typed by the user.

According to yet another embodiment of the contextual discovery application, the computing device of the contextual discovery application further includes an input means for typing at least a word providing the contextual information related to the word, wherein the word is typed in real-time or typed previously using the input means. In an alternate embodiment, the input means is a keypad which is displayed on the display unit. In yet another embodiment, the keypad includes a suggestion bar on which a suggestive word is displayed. In one embodiment, the suggestion bar also displays indicative advertisement information along with the word. The suggestion bar receives a fourth user input to render the advertisement. In an embodiment wherein multiple advertisements relate to same contextual information, the advertisements are displayed on the suggestion bar according to at least one of a computing device ranking and a server ranking.

According to one embodiment of the contextual discovery application, the computing device ranking for the advertisement depends on the fourth user input for the same advertisement over the suggestion bar, wherein the fourth user input is a second time dependent press on the word displayed on the suggestion bar. In another embodiment, the computing device ranking for the advertisement depends on a frequency of the fourth user input for the same advertisement over the suggestion bar. In yet another embodiment, the computing device ranking is also based on a location of the advertisement on the suggestion bar during a usage of the computing device over a time period.

According to another embodiment of the contextual discovery application, the processing unit of the contextual discovery application further comprises a server processor and a client processor communicably connected to each other via a network, wherein the client processor receives the set of information from the data acquisition unit on the computing device, and processes the set of information and identifies the contextual information from the set of information; and the server processor and the client processor in coordination render the advertisement related to the word on a display unit of the computing device.

According to yet another embodiment of the contextual discovery application, the client processor sends the contextual information to the server processor, the server processor receives the advertisement from the database and sends the advertisement related to the advertisement keyword to the client processor, and the client processor further renders the advertisement on the display unit of the computing device.

According to one embodiment of the contextual discovery application, the computing device of the contextual discovery application also includes a memory module having the database and the client processor which receives the advertisement from the database and renders the advertisement on the display unit of the computing device, wherein the server processor updates the database with the advertisements related to the contextual information, whenever the client processor is connected to the server processor.

According to another embodiment of the contextual discovery application, the contextual information is related to multiple advertisements, the advertisements are displayed on the display unit at least repetitively, on the basis of time and geographical location of the computing device.

According to one embodiment of the contextual discovery application, the server processor executes a web portal allowing differential access to users of various categories, wherein at least one category of user is allowed to define the contextual information related to the advertisement, wherein at least one category of user is allowed to upload advertisements, wherein at least one category of user is allowed to determine a user interface of the advertisement to be displayed at the computing device and at least one another category of user is able to view the user interface of the advertisement, wherein at least one category of user is enabled to determine a number of advertisements related to the contextual information, and at least one category of user is allowed to determine a format under which another category of user is allowed to upload the advertisement, and the another category of user is enabled to fill out the format to upload the advertisement.

According to another embodiment of the contextual discovery application, the server processor calculates the server ranking for the advertisement from multiple advertisements related to same contextual information, based on a form data filled out by another category of user in the format while uploading the advertisement, and the advertisements are displayed on the display unit according to the server ranking.

According to yet another embodiment of the contextual discovery application, the contextual information of the contextual discovery application relates to at least a word, and at least one category of user is enabled to reserve or unreserve, and/or block or unblock the words for another category of user, wherein if at least a unique word or a set of words is related to the contextual information and the contextual information is further related to an advertisement, the unique word or the set of words are added in a suggestive database, wherein if one or more words are unreserved or blocked for another category of user, the one or more words are added into the suggestive database, wherein one category of user is enabled to notify the other category of the user regarding words from the suggestive database, wherein at least one category of user is enabled to upload the advertisement and further enabled to decide an upload of an advertisement in relation to a particular contextual information where the contextual information already has at least one related advertisement.

According to one embodiment of the contextual discovery application, the client processor of the contextual discovery application collects and sends analytic information to the server processor. In one embodiment, the analytic information comprises a first user input for selecting an advertisement from a first grid of advertisement. In another embodiment, the analytic information comprises a grid location of the advertisement on the first grid. In yet another embodiment, the analytic information also includes a second user input for selecting a sub-service related to the advertisement from a second grid, wherein the second grid is displayed based on the first user input. In yet another embodiment, the analytic information includes plug-in information to determine whether the contextual discovery application is plugged into the web application, the mobile application or the desktop application. In yet another embodiment, the analytic information includes a time based feedback for duration of viewing of the advertisement on the display unit, wherein the analytic information includes natural timing information referring to time of a day the advertisement is displayed. In yet another embodiment, the analytic information also includes a geographical location of the computing device during usage of the contextual discovery application. In yet another embodiment, the analytic information includes a fourth user input on the suggestion bar to render the advertisement. In yet another embodiment, the analytic information includes, the third user input on the contextual discovery key.

According to another embodiment of the contextual discovery application, the contextual discovery application is a piece of code which is combined along with another piece of code, and adapted to be executed in combination on a computing device, the contextual discovery application on execution makes a processing unit to functions according to various embodiments mentioned above.

According to yet another embodiment of the contextual discovery application, a non-transitory computer readable medium stores the contextual discovery application, the contextual discovery application is adapted to be executed on a computing device, the contextual discovery application on execution makes a processing unit to function according to various embodiments mentioned above.

The present invention also lies in a client device placed at the client, the server and a system of the client and the server, when the contextual discovery application is executed in the client processor of the client device, as explained in various embodiments explained above.

According to one embodiment of the system, the system includes an advertisement server configured to provide advertising information associated with the one or more operator networks and/or one or more category of user uploading the advertisement to the server.

According to another embodiment of the system, the server ranking is based on a comparison of the form data filled by a plurality of form data filled by different users of a same category of user uploading the advertisement.

According to yet another embodiment of the system, the client processor sends the contextual information to the server processor, the server processor receives the advertisement from the database and send the advertisement related to the advertisement keyword to the client processor, and wherein the client processor is further adapted to render the advertisement on the display unit of the computing device.

According to one embodiment of the system, the server processor receives the analytic information from one or more computing devices running the contextual discovery application, and further processes the analytic information received from the computing devices to determine the server ranking.

According to another embodiment of the system, the contextual information relates to at least a word, and at least one category of the user is enabled to reserve or unreserve, and/or block or unblock the words for another category of the user.

According to one embodiment of the system, the server processor receives at least the set of information, the contextual information, an analytic information from one or more client processor and process at least the set of information, the contextual information and the analytic information to identify a current trending context related to a trend among users of the client processors wherein at least one category of the user is adapted to reserve/unreserve the trending context for the another category of user.

According to another embodiment of the system, the server processor predicts a futuristic trending context probable to be occurring in a later time based on at least the set of information, the contextual information and the current trending context.

According to yet another embodiment of the system, the at least one category of user is enabled to set a time period for which the words will be reserved for another category of user.

According to one embodiment of the system, at least one category of user is enabled to define a context of the words such that the combination of words is related to the contextual information.

According to another embodiment of the system, the server processor is further configured to add at least a unique word or set of words related to the contextual information wherein the contextual information is further related to an advertisement, in a suggestive database.

According to yet another embodiment of the system, the server processor is configured to unreserve or block words for a category of user added into the suggestive database, and further configured to enable another category of the user to notify the category of user regarding words in the suggestive database.

According to one embodiment of the system, at least one category of user is enabled to determine a number of advertisements related to same contextual information.

According to one embodiment of the system, at least one category of user is enabled to upload the advertisement and decide an upload of an advertisement in relation to a particular contextual information where the contextual information already has at least one related advertisement.

BRIEF DESCRIPTION OF THE DRAWINGS

The advantages and features of the present invention will become better understood with reference to the detailed description taken in conjunction with the accompanying drawings, wherein like elements are identified with like symbols, and in which:

FIG. 1 illustrates a process flow diagram depicting a process conventionally followed for accessing content on the internet in accordance with an embodiment;

FIG. 2 illustrates a process flow diagram for facilitating contextual discovery in accordance with an embodiment;

Figure 3:
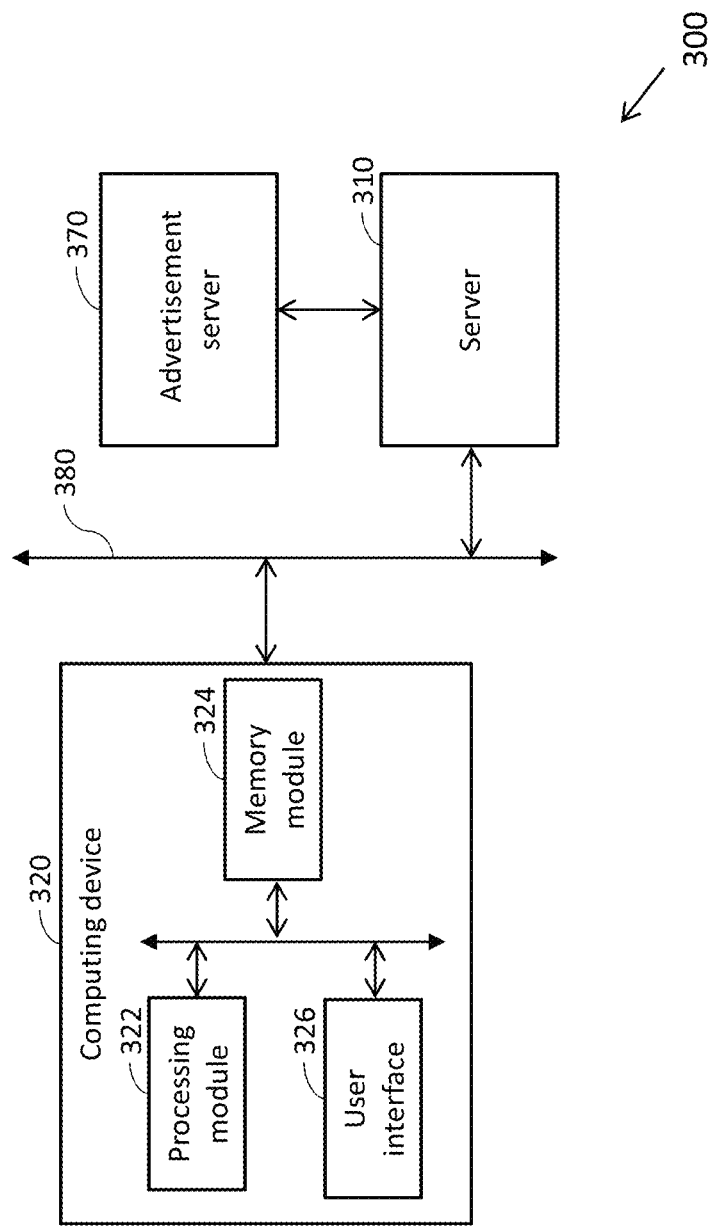
FIG. 3 illustrates a block diagram of an exemplary system for facilitating contextual discovery in accordance with an embodiment.

The drawings referred to in this description are not to be understood as being drawn to scale except if specifically noted, and such drawings are only exemplary in nature.

DETAILED DESCRIPTION

The best and other modes for carrying out the present invention are presented in terms of the embodiments, herein depicted in FIGS. 1 to 11. The embodiments are described herein for illustrative purposes and are subject to many variations. It is understood that various omissions and substitutions of equivalents are contemplated as circumstances may suggest or render expedient, but are intended to cover the application or implementation without departing from the spirit or scope of the present invention. Further, it is to be understood that the phraseology and terminology employed herein are for the purpose of the description and should not be regarded as limiting. Any heading utilized within this description is for convenience only and has no legal or limiting effect.

The terms "a" and "an" herein do not denote a limitation of quantity, but rather denote the presence of at least one of the referenced item.

Typically, users of internet perform search using various internet resources for accessing content such as information associated with various products and services. An example of the process typically followed by internet users is illustrated and described with reference to FIG. 1.

Referring now to FIG. 1, a process flow diagram depicting a process 100 conventionally followed for accessing content on the internet is illustrated in accordance with an example embodiment. For example, the process 100 may be followed by internet users for accessing internet resources to access services, such as planning an activity for a weekend, buying a product, identifying a service, and the like. Herein, the process is explained with by taking an example of planning an activity for a weekend by a group of friends.

As illustrated, a group of friends such as a group 110 may initiate a discussion for planning an activity on a weekend. Typically, the planning of said activity may be performed by meeting, calling, texting messages for example by way of short messaging service (SMS), chatting or any other such means. Once the group 110 agrees on meeting up for a particular activity on the weekend, one or more members of the group may take up an initiative of making necessary arrangements for the activity. For example, the group 110 may decide to watch a movie on the weekend, one of the members such as a member 112 of the group 110 may take up the responsibility of determining the availability of movie tickets, and booking the movie tickets for a particular movie show at a selected cinema hall. For determining the availability of movie tickets, and subsequently booking the tickets, the group member 112 may access internet and perform a search for certain web-sites offering the services of checking tickets availability and booking of the movie tickets. Based on the search, the user may be presented with search results (illustrated by a UI of 120) containing various booking options.

Typically, such advertisements are provided by the advertisers of the related content. For example, the advertisers may select certain websites which provide context or services related to the advertiser's business and provide advertisements on such websites. However, the process of adding such advertising promotions to the websites is expensive for the advertisers. Further, accessing the web content for searching and shortlisting a relevant service or product is time consuming for the end-user, for example for the member 112 of the group 110. Moreover, conventional on-line marketing and advertising techniques are often limited in their ability to provide contextually relevant information to the end-users. In addition, searching for a requisite product or service on the internet exposes the user to security and privacy related issues, and should be avoided. Further, the advertisements are not shown to the user in real-time, for example, during the discussion amongst the users (such as the group 110 of friends) or while one of the users is planning an activity. Examples of such activities may include but are not limited to, planning for a movie show, a dinner party, buying a product such as an electronic item, and the like.

The present invention provides various systems and methods for facilitating contextual discovery such as provisioning of contextual advertisements, services, and the like to the users in a cost-efficient and time-efficient manner in real-time. The present invention suggests providing a contextual discovery application implemented in a computing device that may enable the user of the device to automatically perform contextual discovery and in response provide contextual advertisements relevant to a current context of a user input. For example, when a user is engaged in a discussion (for example, by means of an email, SMS, etc.) with another individual for planning an activity by using the computing device, the contextual discovery application may retrieve useful results based on a determination of context of the activity from the discussion. In various embodiments, the contextual discovery application may be initiated in a computing device by means of physical user interface components such as buttons and touch-screen components; and non-touch user interfaces responsive to user-gestures, and the like. Various embodiments of the systems and methods for providing contextual discovery to the users in real-time are described with reference to FIGS. 2 to 11.

FIG. 2 illustrates a process flow diagram 200 for facilitating contextual discovery in accordance with an embodiment. Herein, the term 'contextual discovery' may refer to a provisioning of advertisements, look-up based results, services, contextual home-screen, contextual add-ons, contextual application programming interface (API) and the like at a computing device based on one or more of an input provided by the user of the computing device, learning from user's profiles and accounts, user's device usage, content being accessed by the user on the computing device, content being created or accessed by the user on the connected devices, content being created or accessed by the user on the cloud/cloud services and the like. In the present example embodiment, the process flow diagram 200 pertains to a process that may be followed by a group 210 of users to access services, such as planning an activity for a weekend. The group 210 may initiate a discussion for planning an activity on a weekend, for example by means of one of SMS, IM, email, or any other such means.

During the discussion, one of the members of the group may start typing suggestions for the weekend activity. For example, the suggestion may comprise watching a movie. In accordance with the present invention, when the user inputs the suggestion using the UI of the device, the contextual discovery application that is installed on the computing device determine a context of the user input from the contents of the discussion, and provide a notification upon identification of a context of the discussion. For instance, in the present example, the contextual discovery application may determine the context of the discussion from the words such as 'movie' and 'coming weekend', and identify information relevant to the context of the discussion. In the present example, a contextual discovery key may provide a notification regarding availability of contextually relevant information. In another embodiment, the contextual discovery key may also provide a notification when a combination of any of the recent history, early learning, user profiling and the hyper aware context of the current session (like semantics, topic, sentiment, etc.) is identified relevant to a contextually relevant advertisement. The contextual discovery key may glow, provide notifications or may change state. For example, a user had typed two hours earlier on a social platform "I love Hindi action movies". The contextually relevant advertisements related to Hindi action movies are displayed on top. Also, the user has set a profile interest on a connected account or the contextual discovery application as, "Interested in movies, couch surfing, etc." And now the user currently types, "Hey, I am quite lazy this weekend." The contextual discovery key glows. The user hits contextual discovery key/long presses on the suggestion weekend in the suggestion bar. With this user's action, an advertisement for "Netflix™" which is a provider of Bollywood movies, is shown which says: "Rent Bollywood Action Flicks at 50% off. Weekend Offer." As mentioned hereinabove, the intelligence involved from the contextual discovery application will infer the interests combined with the user typed info of "lazy" mood with a temporal info of "weekend". Moods are qualified/quantified on a scale based on usage of words/context like, "I am happy", "Feel quite frustrated", "Terribly sorry", "Bored to death", etc. Furthermore, the moods may be inferred from the type of emoticons used in texting or in a learnt content.

With continuing reference to FIG. 2, the indication may be provided by means of a visual key 212 on the UI of the computing device 214 that may light up indicating availability of one or more 'movie' suggestions for the 'coming weekend'. It is to be noted that in alternate embodiments, the notification may be provided by any other visual means, audio means, audio-visual means, vibration means, or a combination thereof.

Based on the derived context, the contextual discovery application implemented on the computing device 214 is configured to perform contextual discovery by utilizing a database of contextual information pre-loaded on the computing device. In one example, a word "food" is tagged with two advertisers A and B. If there are more number of users in a particular region viewing A's advertisement or hitting A's advertisement to know more information, A's advertising information can be provided as pre-loaded information for those who are newly installing the software.

It will also be appreciated that the context of the user input may be determined by, among other things, a location context, time context and the like in the message. Further the computing device 214 may include a database that may derive learning from user's sources. For example, the database may include the data about the user's preferred language dictionary, learnt information from user's different sources of learning such as social networking accounts, email, IM, SMS, and the like. Furthermore, the database may include information on how words are related to certain topics or categories, how the different topics are related to the user, and so on. The database may also receive information on such word associations for context, significant occurrences of words, and the like. Additionally, the database may include multiple attributes for a specific word such as timestamp, place of use, application of use, frequency of usage, context association, offline corpus information, online learning information, sources of learning initiated by the user, and the like.

In an embodiment, performing of contextual searching is a user-initiated action, and accordingly the invention provides a secure way of accessing contextually relevant information. In an alternate embodiment, the contextual searching may be performed in a non-user-initiated manner. For example, the database may derive learning from user's usage of the computing device to determine contextually relevant services and/or applications. The computing device may then present such contextually relevant services/application to the user, by means of contextual home-screens, widget, plug-ins, applications, and the like on the computing device.

The UI of the computing device 214 may present the contextually relevant information, such as advertisements, services, add-on packages and the like to the user. The UI may further allow the user to access the contextually relevant information by means of a user action. Various examples of user actions may include, but are not limited to, user gestures, audio input, user touch, swipe, and the like. It will be appreciated that the UI presents one or more advertisements that are contextually relevant to the user input (for example, 'movie' suggestions for the 'coming weekend'). As an additional example, in case of the user input for 'movie today' versus 'movie at 5 PM', the computing device 214 may present highly contextual information such as grid information/APIs/application/web-pages matching with the user input. For example, in case of user input 'movie today', the user may be presented with information on various movie shows that are playing 'today'. However, in case the user input comprises 'movie at 5 PM', the user may be presented with information primarily on movie shows playing today at 5 PM, and not shows playing at other timings today. It will also be appreciated that the advertisements are presented to the user in real-time, the present invention allows the users to access the advertisements in real-time, for example when the user is engaged in a discussion with other individuals, texting a message, sending an email, and the like.

In the present example, the user may be presented with a list/grid of contextually relevant information, such as advertisements and/or services and/or look-up searches. The user may select one of the options such as the option 216. Upon selection, the user may be presented with the details of the selected option 216. In an embodiment, the details of the selected option may be presented to the user by means of the UI on the computing device 214. The user may perform subsequent actions 218, such as requesting more options, requesting further information for the selected option, registering with one of the service providers of the selected options, downloading applications relevant to the search, opening up the related service provider's page/application, refer the applications to friends, and the like. As is noted herein, the subsequent actions performed by the user facilitates in increased activity associated with searched content, thereby increasing the ROI. An exemplary system for facilitating contextual discovery is illustrated and explained with reference to FIG. 3.

FIG. 3 illustrates a block diagram of an exemplary system 300 for facilitating contextual discovery in accordance with an embodiment. The system 300 is configured to facilitate contextual discovery in a time-efficient and cost-efficient manner in real-time. As illustrated in FIG. 3, the system 300 includes a server 310, for example a data processing server, and at least one client for example a computing device 320. The server 310 may include a server processor adapted to receive and process information for facilitating contextual discovery.

The exemplary server 310 is configured to receive information for facilitating contextual discovery at the computing device 320. In an embodiment, the server 310 is configured to receive the information from at least one advertisement server such as an advertisement server 370. In an embodiment, the server 310 is configured to receive information such as uniform resource identifiers (URIs), application programming interface (APIs) associated with queries, keywords, phrases, promotional messages, images, icons and the like associated with respective services and products from the advertisement server 370. In various embodiments, the advertisement server 370 is further configured to provide updates associated with the information to the server 310. In an embodiment, the server 310 is configured to receive said information from the advertisement server 370 by allowing the advertisement server and/or advertisers to log-in to the server 310, and subsequently providing advertiser credentials. In another embodiment, the server 310 is configured to receive said information from the advertisement server 370 by accessing the advertisement server 370 (for example, based on access information). In an embodiment, the advertisement server 370 is configured to provide the information to the server 310 in a predetermined format.

In another embodiment, the server 310 is configured to allow the advertisers to log-in to the server 310 based on advertiser's credentials, and provide the mapping of keywords and APIs, sentences/questions, icons, images, promo messages, queries and the like. In this scenario an advertisement server 370 is not required since herein, the server 310 facilitates a direct communication with the advertisers, thereby precluding a need of advertisement server 370 in the system 300.

In an embodiment, the server 310, which includes the server processor, may be any kind of equipment that is able to communicate with the advertisement server 370, the at least one client, for example, the computing device 320 and/or advertisers. Accordingly, in an embodiment, a device, such as a communication device (for example, a mobile phone) may comprise or include a server connected to the Internet. In an embodiment, the server 310 may communicate with the client by means of a communication path, for example a communication path 380. In an embodiment, the communication path linking the at least one client, for example, the computing device 320 and the server 310 may include a radio link access network of a wireless communication network. Examples of wireless communication network may include, but are not limited to a cellular communication network. For example, the server 310 and the computing device 320 may be configured to communicate with each other using at least one of a plurality of Institute of Electrical and Electronics Engineers (IEEE) 802.11 protocols. Examples of IEEE 802.11 protocols may include, but are not limited to, IEEE 802.11a, IEEE 802.11b, IEEE 802.11g, IEEE 802.11n and IEEE 802.11ac wireless LAN protocols and the like. It is also noted that the various components of the system 300 may also communicate with each other using non Wi-Fi protocols, such as Zigbee or sub-giga hertz network protocols, or using Bluetooth signals.

The communication path 380 may additionally include other elements of a wireless communication network and even elements of a wired communication network to which the wireless communication network is coupled. Examples of the wired connection 380 may include cables, buses (for example a data bus or a control bus), optical conductors and the like.

The at least one client may include the computing device, for example the computing device 320, and is configured to receive a user input. The at least one client may also be configured to utilize the context of the user input in the computing device to perform a contextual discovery and provide contextually relevant information, for example, lookup and/or advertisement and/or services. In an embodiment, the computing device is configured to determine the context of the user input based on keywords associated with the user input. Additionally or alternatively, it will also be appreciated that the context of the user input may be determined by, among other things, a location context (for example location of one or more participants associated with the user input), time context, application in use, conversation history of the user, user preferences and the like in the user input. Examples of the computing device 310 may include a (1) data processing device, such as a personal computer, a tablet computer and/or a laptop, (2) a communication device, such as a mobile device or a Smartphone, and the like (3) any other device communicably coupled with the computing device 310 by means of, for example, cloud, and the like.

The advertisement information may be provided on the basis of what user has typed across all the applications and metadata collected across all the applications and in the widget.

In an embodiment, the contextual discovery may include determination of context sensitive home-screen for the computing device. In the present embodiment, based on a determination of time context, profile context, location context, content being consumed on the computing device, content being created on the device, text input analytics, and the like different placeholders may be given for advertisements to be pushed into the computing device that may be contextually relevant and personal to the user. Additionally or alternatively, the contextual discovery may include a context sensitive widget presented on the home-screen of the computing device. The context sensitive widget may facilitate input of text from the user of the computing device. The context sensitive widget may further be configured to facilitate contextual discovery in the computing device based on time context, profile context, location context, content being consumed on the computing device, content being created on the device, text input analytics, and the like.

The client 320 includes a client processor having a processing module 322, a memory module 324, and a user interface 326. However, in the exemplary embodiments, the client 320 which is a computing device may include the client processor configured to perform the processing without having an additional processing module 322. In one embodiment, the client processor includes a data acquisition unit adapted acquire a set of information and send the information to be used by the contextual discovery application running on the client 320. The client 320 is configured to receive the user input by means of the user interface 326. In an embodiment, the user input may include text entry into any editor/applications such as Notes, instant messaging (IM), short messaging service (SMS), email, and the like in the user interface 326 associated with the client 320.

The context discovery can be with respect to Notes in one of the application. The contextual discovery key is a part of the Notes application. The contextual discovery key can be provided as an intrinsic part of Notes application or the contextual discovery application can be provided as a plug-in to the Notes application or a source code related to contextual discovery application can be embedded into a source code of the Notes application. User can enter the to-do list, for example, in the Notes application a contextual discovery key is given for every user's activity. For example: User entered, movie this Saturday. The key gets activated/glows when it identifies the words movie and Saturday and also the context being typed and upon tapping on the key, serves advertisements.

The client processor or the processing module 322 of the computing device 320 may be configured to perform a semantic analysis of the text input by user, and identify contextually relevant information (for example, advertisements). As used herein, the terms "client processor" and "the processing module" are used interchangeably throughout the description without deviating from the spirit of the invention. Additionally or alternatively, the processing module 322 is configured to identify a 'brand experience' based on the semantic analysis of the text input by the user. Examples of brand experience may include, but are not limited to shopping experience and relevant brand advertisements, eat-out experience and relevant brand advertisements, and the like. The 'brand experiences' may be embodied in form of applications and/or add-ons and provided in the computing device 320. For example, a brand experience associated with a social networking site may include a language dictionary, theme, lingo dictionary, and the like associated with the social networking site.

The processing module 322 may be configured to assign weights to the brands in semantics, moods, sentiments, context, and the like. For example, the processing module 322 may provide a branding experience such as "Coketti— Open Happiness" to user, that may subsequently be downloaded by the user. Based on a determination of downloading of a branding experience by the user, the processing module 322 may be configured to assign weightage to positive words (stored in a memory module of the computing device 320) such as "happy", "I am happy", "love it", "a whole new world", "charity", "funny", "laugh", "lol". Moreover, the processing module 322 may be configured to update user preferences. For example, the processing module 322 may facilitate display of Coketti branded icons, emoticons, text, animations, videos and the like for communication on the user interface (for example, the keyboard layout or additional layouts or buttons/regions) of the computing device 320. Additionally, the processing module 322 may be configured to match the semantics and context of the user input against 'Coketti' brand on priority while performing contextual discovery on the computing device 320. The processing module 322 may further facilitate provisioning of a default space for 'Coketti' branded advertisements on the user interface. Also, the processing module 322 is configured to suggest the identified brand experience to the user. In certain embodiments, the brand experience may be provided dynamically on the computing device 320 based on a time context, date context, and the like. Examples of the date/time context may include, but are not limited to after work, after-hours, breakfast time, wake-up time, news time, and the like.

Additionally the processing module 322 can be configured to identify location, time (today, morning, afternoon, evening, weekend, Saturday, Sunday, etc.), user's previous ad selection from suggestion bar, or from grid 1 or grid 2, user's text entered (word/phrase/context) in the editor. Still additionally, the processing module 322 is configured to identify total messages/chats being typed using the software and messages that are already exist on the device, IM application chat history, browsing history, etc. By considering these, the advertisements may be served. Advertising based on temporal information: If the word 'shoes' is tagged with Company ABC and the word 'Website X' is tagged with 'Website X', user has typed "will buy shoes from 'Website X'". In this particular sentence, user could see Company ABC advertising information and 'Website X' advertising information in suggestion bar and also in the grid 1. If the user continued typing and entered "will buy shoes from 'Website X' today", the present software also shows 'Website X' ad for the word 'today' only in this particular context provided if the advertiser 'Website X' also owns the word 'today' and the 'Website X' ad for the word today can be sale on the day or discount on the day the user is being typed.

In an embodiment, the processing module 322 may be embodied as a multi-core processor, a single core processor, or a combination of one or more multi-core processors and one or more single core processors. For example, the processing module 322 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processing module 322 may be configured to execute hard-coded functionality. In an embodiment, the processing module 322 is embodied as an executor of software instructions, wherein the instructions may specifically configure the processing module 322 to perform the algorithms and/or operations described herein when the instructions are executed. The processing module 322 may include, among other things, a clock, an arithmetic logic unit (ALU) and logic gates configured to support an operation of the processing module 322.

The memory module 324 of the computing device 320 includes pre-loaded data associated with the contextual discovery application. The memory module 324 is configured to receive the pre-loaded data from the server, for example, the server 310. In certain embodiments, the pre-loaded data may include brand experiences and/or advertiser information. Examples of the memory module 324 may include, but are not limited to, random access memory (RAM), dual port RAM, synchronous dynamic RAM (SDRAM), double data rate SDRAM (DDR SDRAM), and the like. The pre-loaded data may be provided by the server 310. In an embodiment, the pre-loaded data may be provided to the memory module 324 of the computing device 320 by means of offline upload and updating of the information in the computing device, thereby precluding a need of accessing the internet while the user provides the user input. An implementation of system 300 is explained herein with reference to FIG. 4.

In alternate embodiments, the server component may provide/pre-load said information in the computing device, and provides additional information by means of online updating. In an example embodiment, the pre-loaded information may be modified based on user preferences. For example, upon downloading of a brand experience by a user, the weightage assigned to the downloaded brand-experience may be updated in the memory module 324. An implementation of such a system is explained herein with reference to FIG. 5.

In an embodiment, the processing module 322 may perform a semantic analysis of the user input to identify a contextually relevant match in the pre-loaded data. The contextually relevant pre-loaded data may be presented to the user by means of the user interface 326 of the computing device 300. In yet another embodiment, the information may be updated by, for example, the one or more advertisers, and the updated information (comprising, for example, modified and/or added content) may be provided to the memory module 324 of the computing device based on dirty bit notification/push notifications/pull mechanisms etc.

The user interface 326 of the client 320 may be configured to present a notification upon identification of contextually relevant data associated with the text input by the user. In an embodiment, the user interface 326 may include a user interface circuitry and user interface software configured to facilitate a user to control at least one function of the electronic device through use of a display and further configured to respond to user inputs. In an example embodiment, the computing device 320 may include a display circuitry configured to display at least a portion of the user interface of the computing device 320. The display and display circuitry may be configured to facilitate the user to control at least one function of the computing device 320.

In certain example embodiments, the UI 326 may include a key that may change state thereof from an invisible state to a visible state for providing said notification. For example, the UI 326 may include a key that may present a visual notification to the user upon identification of the contextually relevant information. Other examples of change in visible key states may include change in size from small to big, change in color of the key, change in background, change in the image on the key, haptic or tactile feedback, depth of the key, visual feedback, and other such user perceivable indications. It will be appreciated that in certain other embodiments, the notification may be provided by means other than visual means such as audio means, vibration means, and the like without limiting the scope of the present disclosure.

It will also be appreciated that the UI 326 may provide the notification when the user is forward typing or when the user navigates to any part of the text. As used herein, the term 'forward typing' may refer to the scenario when the user input the text into any editor/application like Notes, instant messaging (IM), SMS, Email, and the like. As the user provides the input, the semantic relevance of what the user is inputting is analyzed dynamically. The semantic sense thus derived while providing the user input identifies the relevant paid/free services from the pre-loaded data. Upon identification of the semantic sense and a service, the notification may be provided to the user by means of the UI 326. Also, the term 'navigation mode' may refer to the scenario when the user moves a caret/cursor into any editor/application like Notes, IM, SMS, Email, and the like. In an embodiment, there may be multiple derivations of semantics in the navigation mode.

The user interface 326 is further configured to display the relevant pre-loaded data corresponding to the semantically identified information based on the user action (for example, when the user taps on the key). In an embodiment, the relevant pre-loaded data may be made available to the user as a free service. In alternate embodiments, the relevant pre-loaded data may be made available to the user as paid services.

Figure 4:
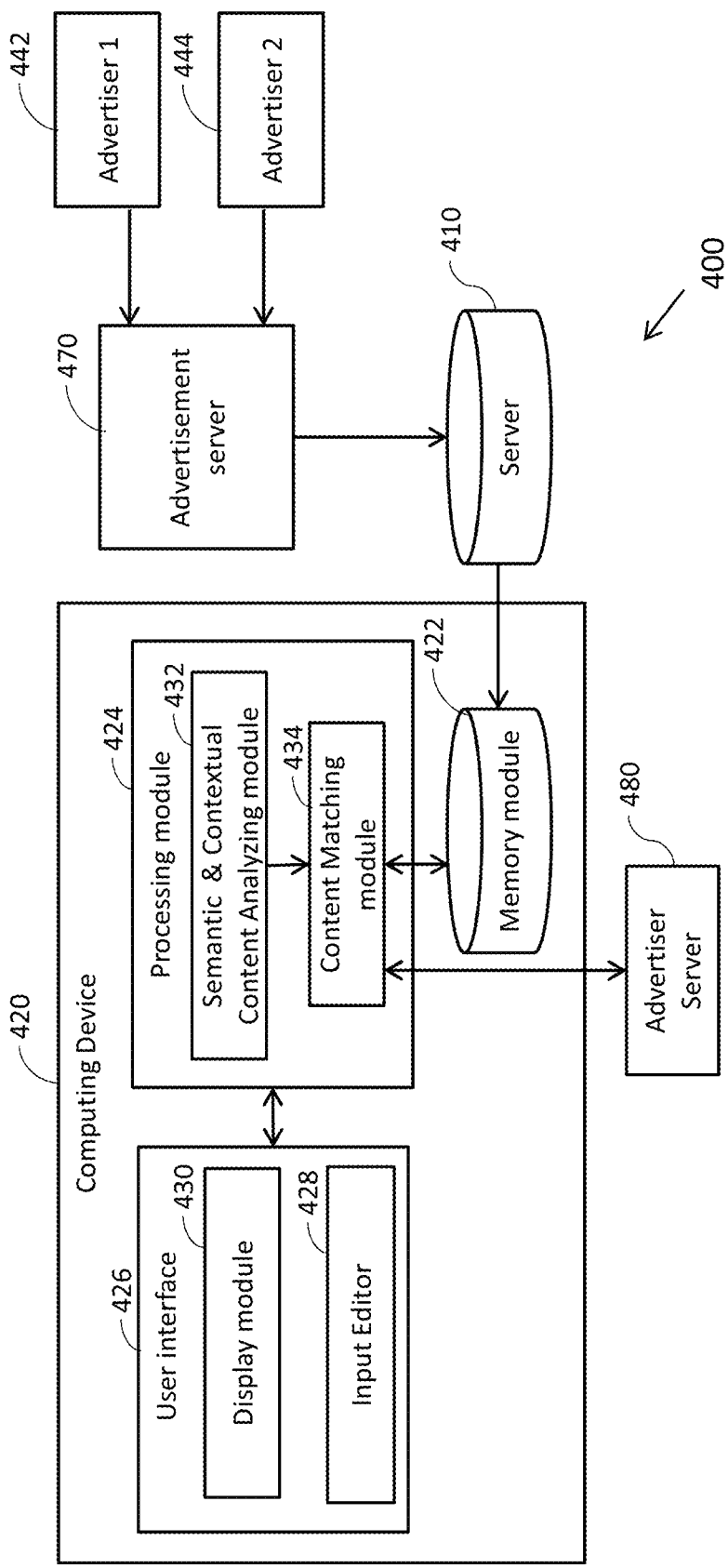
FIG. 4 illustrates a block diagram of another exemplary system for facilitating contextual discovery in accordance with an embodiment.

FIG. 4 illustrates a block diagram of another exemplary system 400 for providing contextual advertisements in accordance with an embodiment. The system 400 includes a server 410, a computing device 420 and an advertisement server 450. The server 410, the computing device 420 and the advertisement server 430 may be similar to the respective components for example the server 310, the computing device 320 and the advertisement server 370 of the system 300 explained with reference to FIG. 3.

The server 410 may be communicably coupled to the computing device 420 and the advertisement server 430. The advertisement server 430 may be configured to receive advertising information from one or more operator networks and/or one or more advertisers, for example, advertisers 442 and 444. The advertisement server 430 may be a mobile operator server. The advertisement server 470 is configured to provide the advertising information associated with the one or more operator networks and/or one or more advertisers to the server 410.

The server 410 may be a data processing server and configured to receive the advertising data/information in a predetermined format. For example, the server 410 receive data/information such as URIs, APIs associated with queries, promotional messages, images, icons and the like associated with respective services and products from the advertisement server 470. In an embodiment, the server 410 may include a database for storing the data provided by the one or more operator networks and/or one or more advertisers. In certain embodiments, the information may be updated in the server 410 by one or more operator networks and/or one or more advertisers. In some embodiment, the updating of the data by the operator networks and/or advertisers may be performed by the operator/advertisers themselves. For example, the operator/advertisers may be provided with unique login credentials which may be utilized by them for updating the data in the server 410. In certain embodiments, an advertiser server 480 may be coupled to the computing device 420 so as to provide the contextually relevant information directly to the computing device 420.

The server 410 is further configured to provide the data to the computing device 420. In an embodiment, the data may be provided offline. In alternate embodiments, the server 410 may provide the data to the computing device 420 via other sources like text files, emails, and the like. In the present embodiment, providing the data may be construed as referring to pre-loading the data by the server 410 in the computing device 420.

In an embodiment, the computing device 420 may include a memory module 422, a processing module 424 and a user interface 426. In an embodiment, the memory module 422 comprises a database for storing the data (referred to as pre-loaded data) provided by the server 410. In some embodiments, the data provided by the server 410 may be pruned and updated into the database of the memory module 410. In an embodiment, the database may be configured to derive learning from user's sources. For example, the database of the memory module 422 may include the data about the user's preferred language dictionary, learnt information from user's different sources of learning such as social networking accounts, email, IM, SMS, and the like. Furthermore, the database may include information on how words are related to certain topics or categories, how the different topics are related to the user, and so on. The database may also receive information on such word associations for context, significant occurrences of words, and the like. Additionally, the database may include multiple attributes for a specific word such as timestamp, place of use, application of use, frequency of usage, context association, offline corpus information, online learning information, sources of learning initiated by the user, and the like. In an embodiment, the information/data may initially be provided to the memory module 422 of the computing device 420 in form of an application or a package such that the package comprises the offline data and necessary software for installing the application in the computing device 420, and any other such information that is necessary for presenting/displaying the contextually relevant information in the computing device 420.

In one embodiment, the database of the memory module 422 may include a recent database and a historical database. The recent database is adapted to store a recent set of information and the historical database is adapted to store a historical set of information or alternatively, a pre-loaded information.

The UI 426 comprises an input editor 428 and a display module 430. The input editor 428 is configured to receive user input by means of any editor of any application in the computing device 420. When the user initiates provisioning of a user input, for example, by typing using the UI 426 of the computing device 420, then the processing module 424 performs a semantic search for identifying the contextually relevant data from the memory module 422. In an embodiment, the processing module 424 may include a context miner that is configured to identify the contextually relevant data from the memory module 422 and provide the matching content to the UI 426. In an embodiment, the context miner may include a semantic and contextual content analyzing module 432 for identifying the contextually relevant data from the memory module 422, and a content matching module 434 for providing the matching content to the display module 430 of the UI 426. As used herein, the context miner may be configured to identify the contextually relevant data based on users preferences, topic, keywords, timestamp based information etc. associated with the user input. In certain embodiments, the mapping of the contextual relevance of the content input by the user and the data stored in the memory module 422 of the computing device 420 may be performed while the user is providing user input.

In certain other embodiments, said mapping may be performed upon a user initiated action, such as tapping a specified key, providing a user gesture, and the like. In an embodiment, the mapping of the contextual relevance of the content input by the user and the data stored in the memory module 422 may be performed in a non-user-initiated manner. For example, the database of the memory module 422 may derive learning from user's usage of the computing device 420 to determine contextually relevant services and/or applications. The UI 426 of the computing device 420 may then present such contextually relevant services/application to the user, by means of contextual home-screens, widgets, plug-ins, applications, and the like on the computing device 420.

Figure 5:
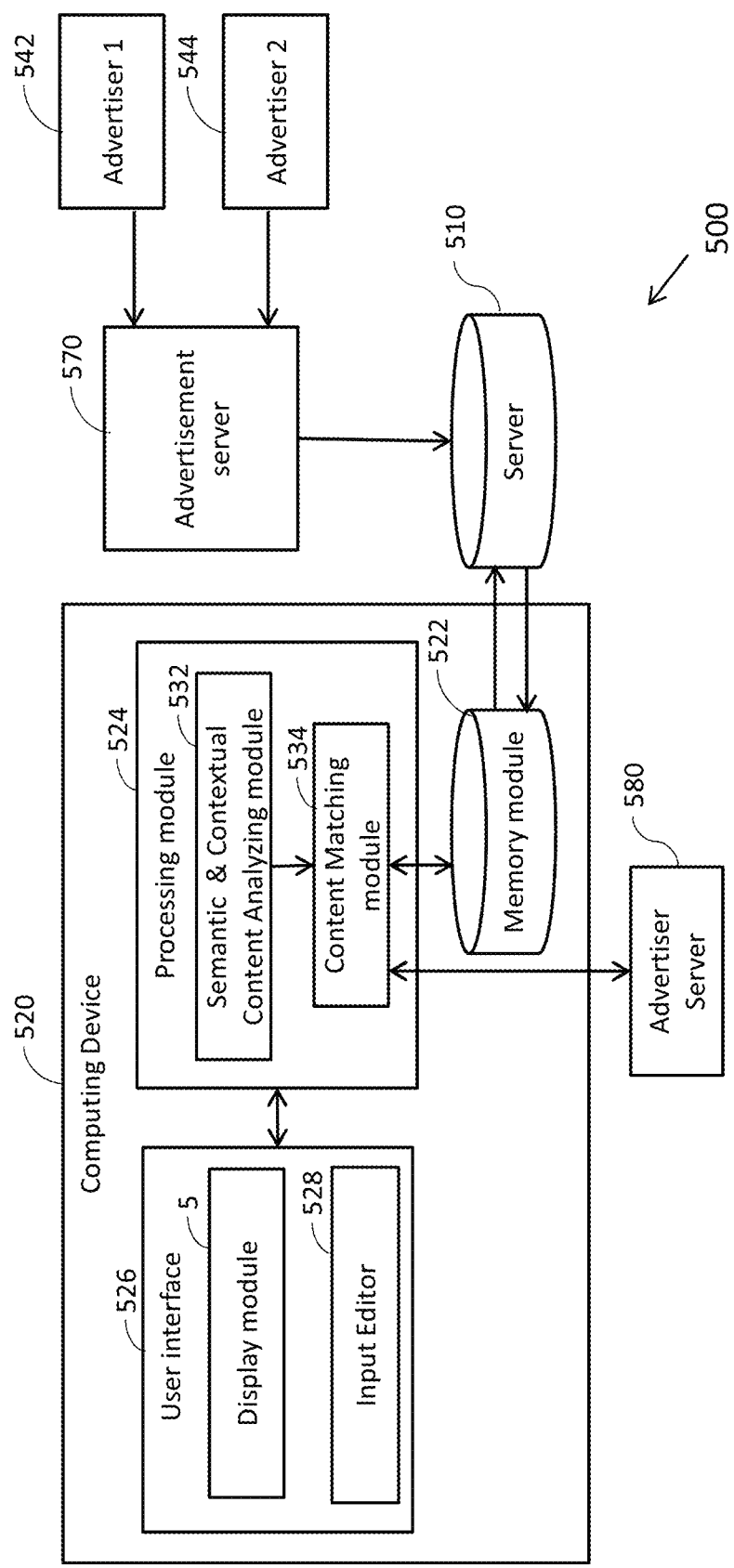
FIG. 5 illustrates a block diagram of yet another exemplary system for facilitating contextual discovery in accordance with an embodiment.

FIG. 5 illustrates a block diagram of an exemplary system 500 for facilitating contextual discovery in accordance with yet another embodiment. The system 500 includes a server 510, a computing device 520 and an advertisement server 530. It is to be noted that the system 500 is similar to similar to the system 300 and system 400. For example, the server 510, the computing device 520 and the advertisement server 570 may be similar to the respective components for example the server 410, the client 420, the advertisement server 470, the advertisers server 480 of the system 400 (explained with reference to FIG. 4) and corresponding components of the system 300 (explained with reference to FIG. 3). For example, the computing device 520 may include a memory module 522, a processing module 524 and a user interface 526. The UI 526 may include an input editor 528 and a display module 530. The processing module 524 may include a semantic and contextual content analyzing module 532 and a context matching module 534. The description of respective components have been explained in detail with reference to system 400 of FIG. 4, and accordingly, the description of functionalities of those components of the system 500 are excluded from herein for the sake of brevity of the description.

However, in the present embodiment, some of the functionalities of components such as the server 510 and the computing device 520 may be different from those of respective components of the systems 300 and 400. For example, in the present embodiment, the one or more operators and/or one or more advertisers such as advertisers 542, 544 may dynamically update the advertisement server 570 with relevant information. For example, when the operator and/or advertisers wish to modify/update the information, they may dynamically send a push notification to the computing device 520 to update the latest data (such as advertisements). The computing device 520 may then update immediately or at next contextual discovery application instance, or an input editor load time. In another embodiment, the push notification may be sent by the advertisement server to the server 510. As disclosed herein, the advertisement server 570 may be a third party server where multiple advertisers register with their credentials, money, and other information to serve advertisers on computation devices registered.

The update may be performed by the one or more operators and/or one or more advertisers by giving unique login credentials to the one or more operators and/or one or more advertisers. Moreover, in some embodiments, the computing device 520 may access the server 510 for pulling the information (such as updates) provided by the advertisers. In some embodiments, initially, for the first time (or during the first time launch of the contextual discovery application), the information may be provided to the computing device 520 in an offline manner. In certain embodiments, the information may not be provided to the computing device 520 in an offline manner, and instead only the updates associated with the pre-loaded data may be provided to the computing device by the server 510 in an offline manner.

In certain embodiments, the updated information may be provided when the user starts providing the user input, for example when the user starts typing in the user interface. The data pulled may be pruned and updated into the memory module 522 of the computing device 520, and accordingly when the user starts using the computing device 520, most of the information to display the contextually relevant data is available within the computing device 520. As the user starts typing, based on the content, the pre-loaded data that matches the content context may be displayed when the user provides a user action. As already discussed, the user action may include accessing a dedicated key on the UI of computing device. It will be appreciated that the dedicated key may be a dedicated hardware key or a soft key across the text editors or applications or some key combinations in the absence of a soft keyboard.

It is noted that the system 300 (or its implementations 400/5000 in FIGS. 4 and 5 respectively) are depicted to include components, such as the computing device, the server, and the advertisement server for illustrative purposes. However, a scope of the systems for performing contextual discovery may not be limited to the systems 300/400/500 as depicted in respective FIGS. 3, 4, 5. In various embodiments, the systems 300/400/500 for performing contextual discovery may include fewer or more number of components than those depicted in FIGS. 3, 4, 5. For example, in some embodiments, the server may be configured with features configured to receive advertisement information directly from the advertisers instead of the advertisement server. Accordingly, in such embodiments, the system 300 (or 400 or 500) may include only the computing device and the server. Some exemplary scenarios indicating implementation of the disclosed concept are illustrated and explained with reference to FIGS. 6 to 11.

Figure 6:
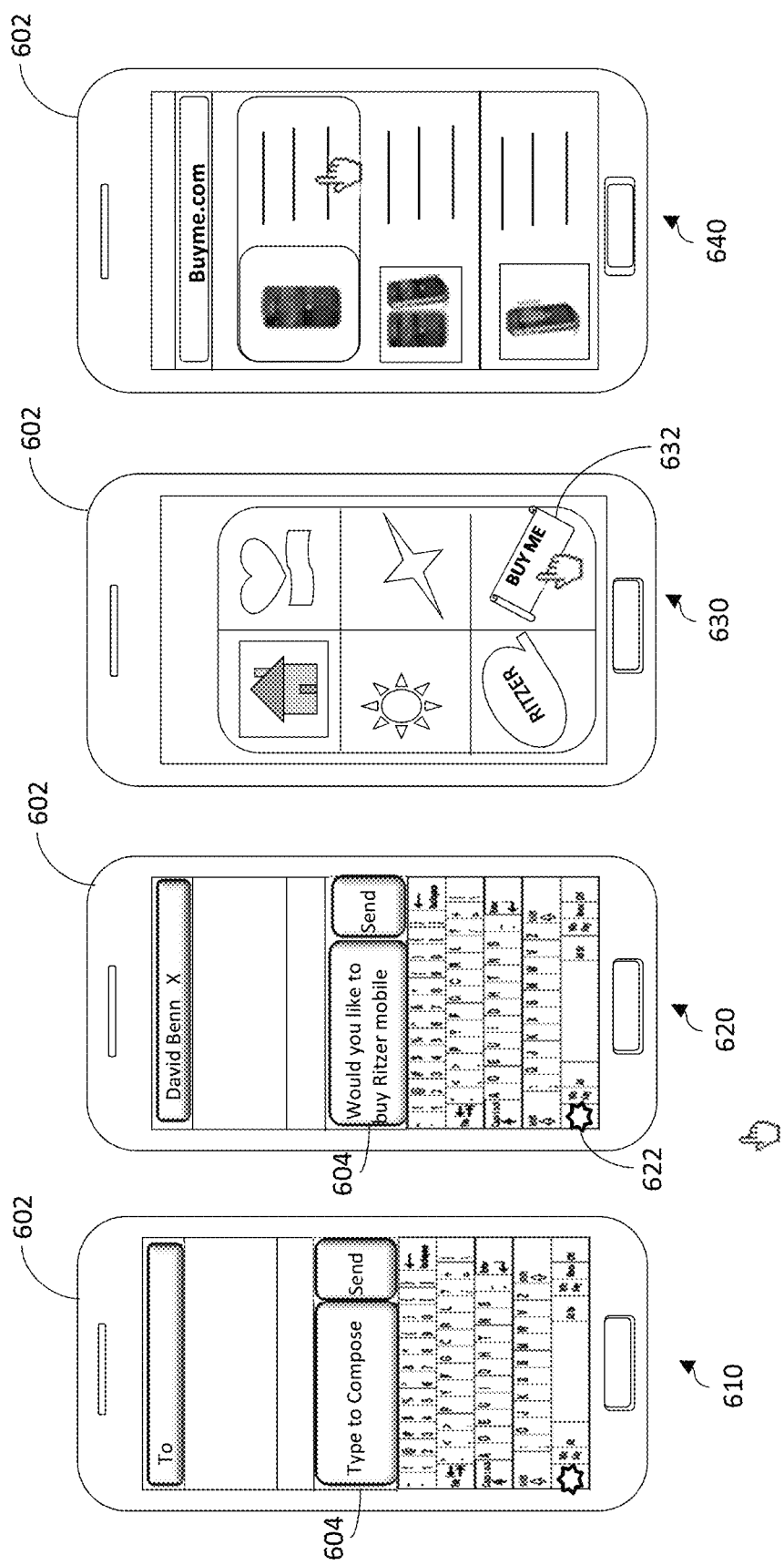
FIG. 6 illustrates a series of screen shots of an exemplary contextual discovery application displaying exemplary graphical user interface in accordance with an example embodiment.

Referring now to FIG. 6, a series of screen shots 610, 620, 630, 640 of an exemplary contextual discovery application displaying exemplary graphical user interface windows displayable on a smartphone or other computing device as part of the application are shown for illustrative purposes. A process for facilitating contextual discovery includes receiving a user input, identifying relevant contextual information of the user input, performing contextual discovery, provisioning of advertisements and/or services relevant to the user input and provisioning of detailed information for enabling user selection of a relevant service/advertisement.

In the present example, use of a system (for example the system 300/400/500) for facilitating contextual discovery on a computing device, for example, a computing device 602 involves provisioning of a text input portion at a UI of the computing device 602. For example, the UI of the computing device 602 comprises a user input portion 604 that may be utilized by a user for entering text.

In the present example, the user may query a friend by inputting a text such as "Would you like to buy a Ritzer phone" (Refer to the screen shot 620) in the text input portion 604. Upon inputting the text, the user may provide a user action, for example tap a key associated with contextual discovery application. For example, the screen shot 620 illustrates a contextual discovery key 622 that may change a visible state thereof to notify an availability of contextually relevant data/information associated with the user input. As per the teachings of the present invention, a processing module along with a memory module associated with the computing device 602 may identify relevant contextual data associated with the user input. In the present example, the processing module along with the memory module may identify the context of the user input by means of keywords of the text such as 'buy' and 'Ritzer phone'. As is already discussed, in some embodiments, the processing module may identify the context of the user input while the user is entering the text. In certain other example embodiments, the processing module may identify the context of the user input when the user has completed the text input, and tapped the contextual discovery key 622. Upon identification of the context of the user input, the UI may be configured to notify availability of advertisements/services relevant to the context of the user input. For example, in the present scenario, the UI may provide websites that may be accessed for 'buying' the 'Ritzer phone', as is illustrated by the screen shot 630. As illustrated in the screen shot 630, the list of websites may be provided in form of a grid. It will however be appreciated that the list of contextually relevant advertisements/services may be provided on the UI in any other pattern/layout without limiting the scope and teachings of the present invention.

As already discussed, the UI may notify the availability of services/advertisements relevant to the context of user input by means of UI components, such as dedicated software or a hardware key. In the present example, the UI comprises a dedicated key on a key board of the UI. The key may assume an off state prior to identifying the availability of services/advertisements relevant to the context of user input, as illustrated in the screen shot 610. In the present example, the off state of the key may be indicated by a star image on the key. Once the user enters the text in the text input portion of the screen and presses the key, the key may assume an on-state, thereby indicating availability of contextually relevant services/advertisements, as illustrated in the screen shot 620.

Once the screen shot 630 provides the list of websites that may be accessed for 'buying' the 'Ritzer phone', the user may select one of the websites from the list on the screen. The user may select one of the websites by means of a user action. In the present example, the user action may include but is not limited to one of tapping on an icon of said website on the screen of the UI, providing a user gesture, an audio gesture, and the like. In the present example, the user may provide a user input for selecting a website such as 'buyme.com' to buy the 'Ritzer phone'. Upon provisioning of the user action for selection of one of the websites from the list, the UI may further present detailed information associated with the relevant content in the selected website. In the present example, upon selection of an icon such as an icon 632 (representing the selected website) on the UI (shown in the screen shot 630), the user may be presented with the UI screen shot 640. The screen shot 640 may present detailed information regarding the contextually relevant product on selected website. The user may select one of the products listed on the website (for example buyme.com) from the screen shot 640. In another example scenario, instead of querying another user, for example, as is done in the example explained with reference to FIG. 6, the user may provide suggestions to other users based on the provisioning of the contextually relevant advertisements/services.

Figure 7:
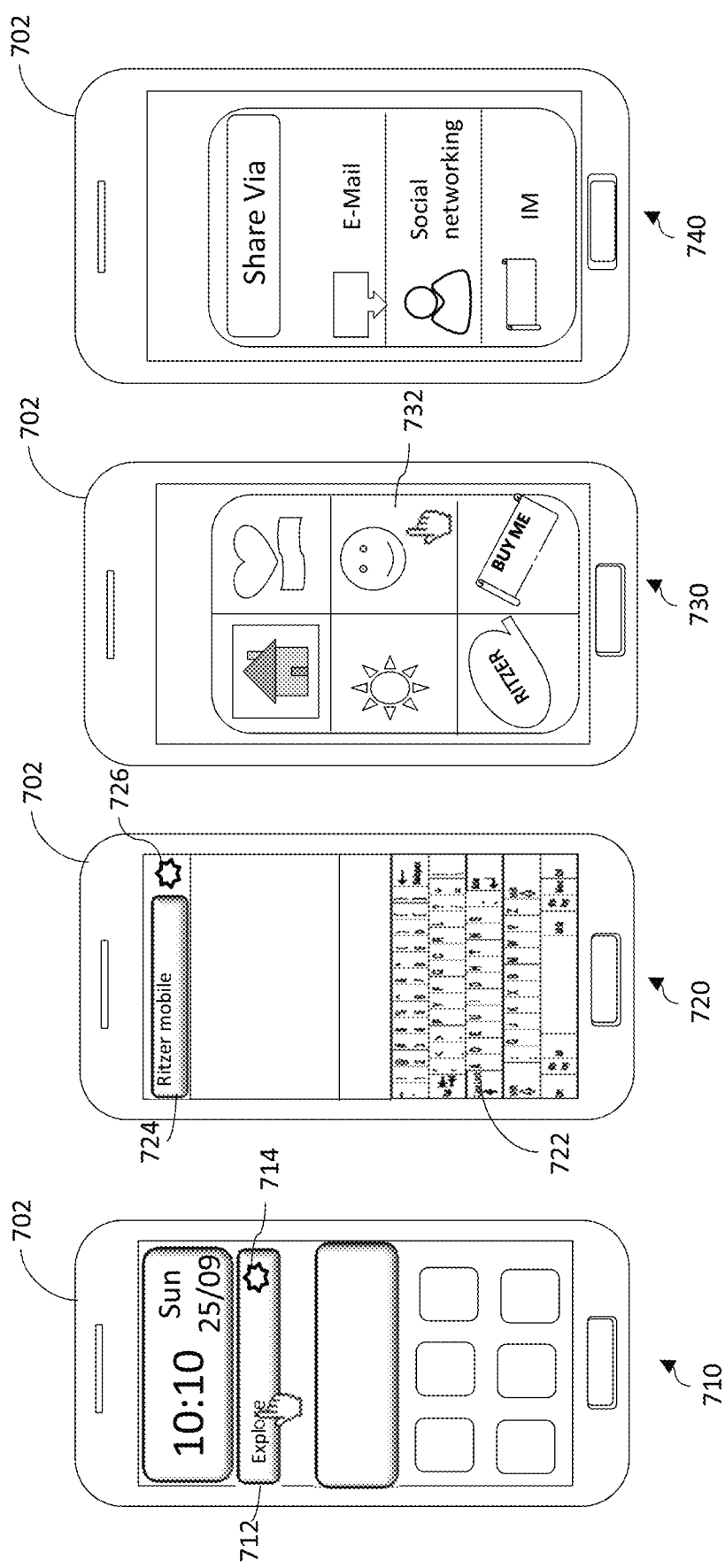
FIG. 7 illustrates a series of screen shots of an exemplary contextual discovery application displaying exemplary graphical user interface in accordance with another example embodiment.

FIG. 7 illustrates a series of screen shots 710, 720, 730, 740 of another exemplary contextual discovery application displaying exemplary graphical user interface windows displayable on a smartphone or other computing device 702 as part of the application shown for illustrative purposes. In this example, the screen shot 710 displays a widget 712 for the contextual discovery application on a home-screen of the computing device 702.

Upon selection of the widget 712, a keyboard may be presented to the user for allowing the user to provide a text input. For example, referring to the screen shot 720, a keyboard 722 may be presented on the UI of the computing device 702 that may be utilized by the user for providing the user input. In the present example, the user may provide the user input in the text input portion 724. For example, the user may type 'Ritzer phone', and subsequently provide a user action for performing the contextual discovery (or provisioning of contextually relevant advertisement/services). It is to be noted that prior to performing the user action, a contextual discovery key 726 (illustrated in the screen shot 710) is in off-state, and upon performing the user action, the contextual discovery key 726 assumes an on-state, for example, is illuminated (as is illustrated in the screen shot 720), thereby indicating identification of advertisements/service contextually relevant to the user input.

The screen shot 730 illustrates provisioning of the list of options relevant to the user input, for example, that may be accessed for buying the 'Ritzer phone'. In an embodiment, the list of options may be provided to the user based on the information gathered and stored in the database of the memory module (for example, memory module 324/422/522 of the contextual discovery systems 300/400/500). As is already discussed with reference to FIGS. 3, 4, 5, the information stored in the memory module of the contextual discovery systems may be gathered based on the type of user, user's preferences, user's context of use of the keywords, and the like across different applications once the contextual discovery system is installed in the computing device. The information is accessed by the widget so that the widget can provide options to learn from the user's social accounts, user's blogs, SMSs, emails, notes, social networking profiles, and other such sources. In certain embodiments, the widget may operate across various application editors in the computing device 702.

In an embodiment, the user may select one of the options from the list on the screen of the UI by performing a user action. Upon provisioning of the user action for selection of one of the options from the list, the UI may present a detailed information associated with the relevant content in the selected website, for example as illustrated in the screen shot 740. For example, the user may select an option 732 on the screen shot 730 indicating sharing of contextual relevant information with a friend, then the screen shot 740 may provide a list of options that may allow the user to share the contextually relevant information with the friend. For example, the screen shot 740 may provide options such as IM, email options, social networking options, and the like to the user. In certain embodiments, the UI illustrated in the screen shot 730 may allow insertion of a quick link or any other information pertaining to the selected contextually relevant information automatically into the message, thereby enabling the user to directly share said quick link/information with the friend(s) being addressed in the message.

It will be noted that the widget is a contextual discovery widget, and accordingly may operate with the contextual discovery system/application (discussed with reference to FIGS. 3, 4, and 5). In an embodiment, the widget is also configured to facilitate in provisioning of the list of search words/options to the user. For example, when a user inputs a word, such as 'movie' in the search widget, the widget may retrieve related keywords for the user who likes to watch movies at home. Some example of related keywords may include, but are not limited to home, download, home delivery of food (for example, the contextual discovery system may identify that user watches movie at home and can order a pizza during the same time), and other such options. Accordingly, the search results offered to the user may include the searches on these related keywords as well.

In certain other embodiments, the conceptual discovery widget associated with the conceptual discovery system/application may provide results based on the learning initiated by the user from the user's own sources. In certain embodiments, the conceptual discovery system/application can be in synchronization with the learning performed on other connected devices of the user. For example, said synchronization may be initiated with a first logon at the computing device. Alternatively, the computing device may provide the user with an option to synchronize the learning of the computing device with the learning performed on other connected devices. Accordingly, the results are more in synchronization with the user's preference and profiles across connected devices.

It will be appreciated that related keywords, topics and user data required to initiate the refined/related search in the contextual discovery search widget can be embodied in APIs for third party search engines since the contextual discovery search widget gets access to valuable information that may have been input by the user across different applications on different connected devices. Accordingly, the contextual discovery search widget may retrieve valuable information on different services that may have interested the user already when using the contextual discovery powered applications/widgets/keyboard and other such components. The third party search engine may thereafter utilize this data to provide related advertisements/services on a search results page thereof. As an exemplary scenario, when add-ons associated with a branded beverage are downloaded by a user from the keyboard system associated with the computing device, then said information regarding the download may be included in the database associated with the contextual discovery application, and may be utilized for a search engine (such as contextual discovery search engine or a third party search engine) to augment results on a search keyword "weekend party games" with advertisements from "beverage".

Figure 8:
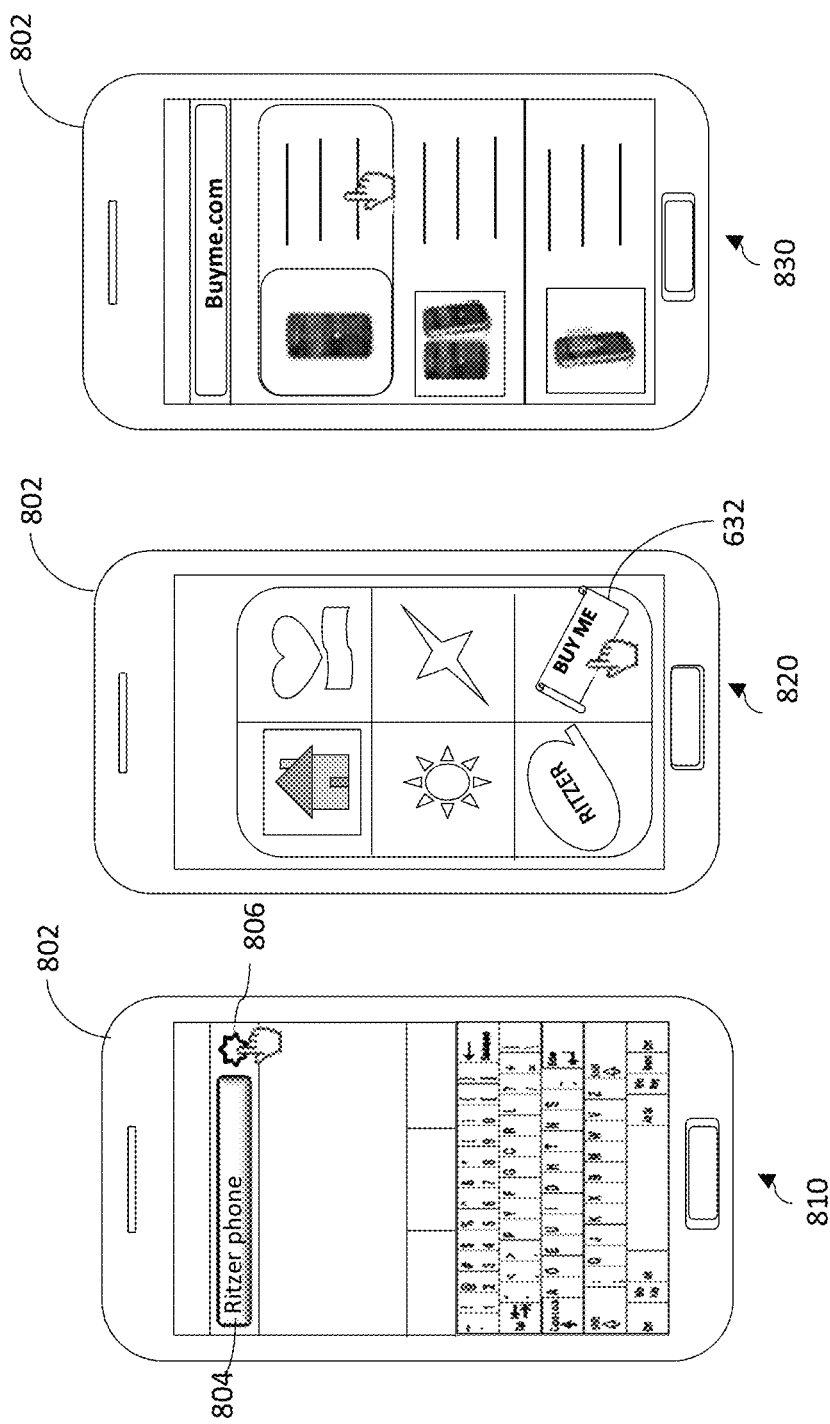
FIG. 8 illustrates a series of screen shots of an exemplary contextual discovery application displaying exemplary graphical user interface in accordance with yet another example embodiment.

FIG. 8 illustrates a series of screen shots 810, 820, 830 of another exemplary contextual discovery application displaying exemplary graphical user interface windows displayable on a smartphone or other computing device as part of the application shown for illustrative purposes. In the present example, a user may access a widget for contextual discovery application, and provide a user input in a user input portion associated with the widget. As illustrated in the screen shot 810, the user may provide a user input such as 'Ritzer phone' for determining contextually relevant advertisements associated with 'Ritzer phone'. Upon entering the user input in a user input portion 804 of the computing device 802, the contextual discovery key 806 may be illuminated, thereby notifying identification of information such as advertisements/services contextually relevant to the user input. As illustrated in the screen shot 820, the UI may present a list/grid of contextually relevant advertisements/services to the user, thereby allowing the user to select one of the many websites from the list on the screen. The user may select one of the websites by means of a user action, for example tapping on an icon of said website on the screen of the UI, providing a user gesture, an audio gesture, and the like. Upon provisioning of the user action, the UI may present detailed information associated with the selected website, as illustrated in the screen shot 830.

Figure 9:
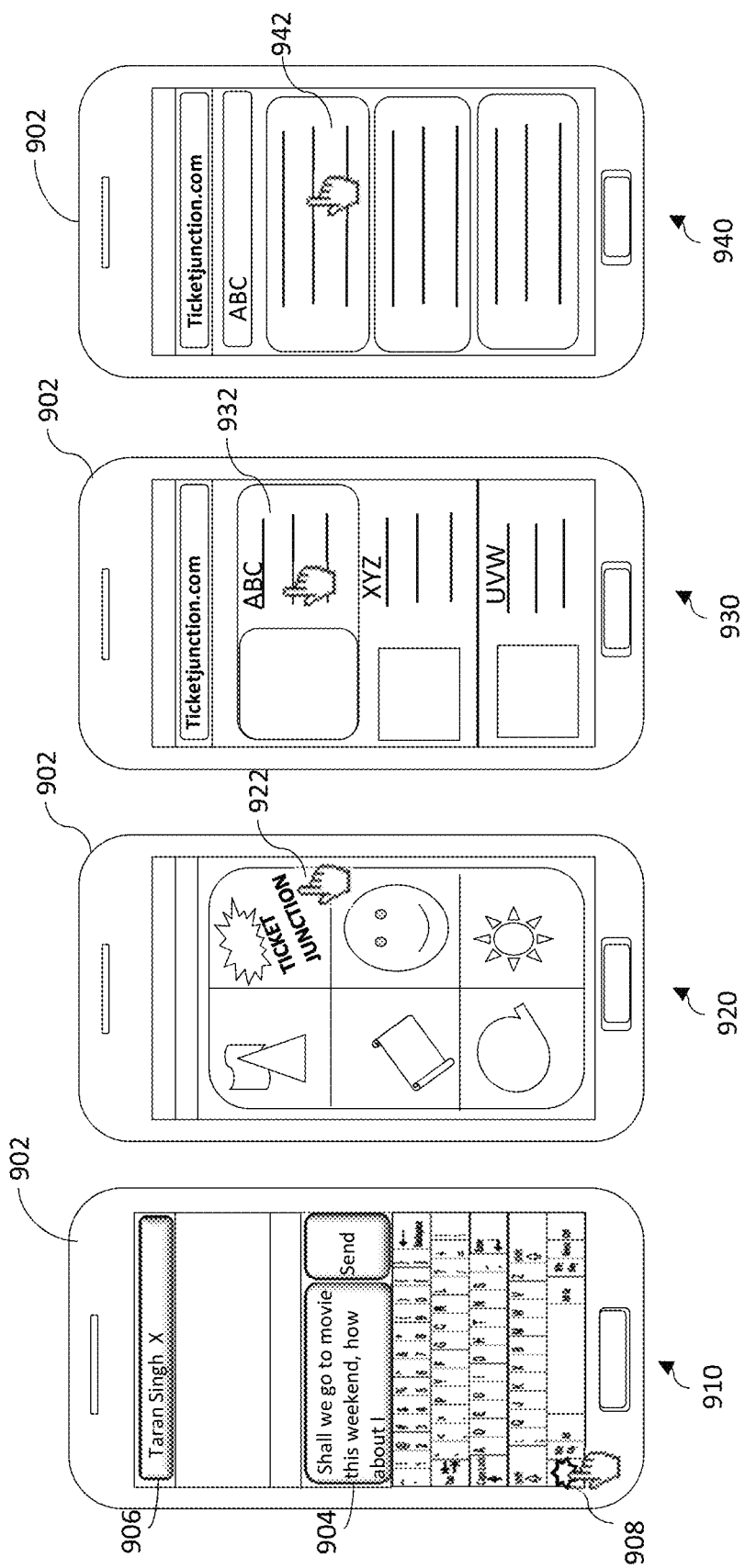
FIG. 9 illustrates a series of screen shots of an exemplary contextual discovery application displaying exemplary graphical user interface in accordance with still another embodiment.

FIG. 9 illustrates a series of screen shots 910, 920, 930, 940 of yet another exemplary contextual discovery application displaying exemplary graphical user interface windows displayable on a smartphone or other computing device as part of the application shown for illustrative purposes. The UI window of a computing device 902 may include a user input portion 904 for allowing the user to provide user input. In the present example, the user may access the contextual discovery application by using a messaging service/editor of the computing device 902. For example, the user 902 may determine one or more contextual advertisements corresponding to the user input, and send the same to one or more users by using the contextually relevant provisioning application. The details (such as names) of the one or more users may be mentioned in a recipient's names window, for example, a window 906 in the UI.

In the present example scenario, the user may wish to plan an activity with one or more friends. For doing so, the user may access a messaging service editor of the computing device 902, and provide a user input such as "Shall we go to a movie, this weekend. How about . . . " (Refer to the screen shot 910). For identifying the contextually relevant information associated with the user input, the user may provide a user action such as a tap on a contextual discovery key 908. Upon initiating of the user action, a processing module in conjunction with a memory module associated with the computing device may identify relevant contextual information associated with the user input. In the present example, a processing module along with a memory module of the computing device 902 may identify the context of the user input by means of keywords of the text such as 'movie' and 'this weekend'. The UI may be configured to notify availability of advertisements/services relevant to the context of the user input. For example, in the present scenario, the UI may provide a listing of popular websites that may be accessed for 'movie' the 'this weekend', as is illustrated by the screen shot 920. It will be appreciated that the list of contextually relevant advertisements/services may be provided on the UI in any other pattern/layout without limiting the scope and teachings of the present invention.

The user may select one of the websites, for example, a website 922 from the list on the screen on the screen shot 920. For example, the user may select a website such as 'ticketjunction.com'. The user may select one of the websites by means of a user action. In the present example, the user action may include but is not limited to one of tapping on an icon of said website on the screen of the UI, providing a user gesture, an audio gesture, and the like. Upon provisioning of the user action for selection of one of the websites from the list, the UI may present detailed information associated with the relevant content in the selected website. For example, in the present example, the user may select an icon such as icon 932 on the UI (shown in the screen shot 930) for selecting a movie (for example, a movie ABC) from among the list of movies. Upon selection, the user may be presented with another screen listing various shows of the selected movie available for being shown on the 'coming weekend', as illustrated in the screen shot 940. The user may select one of the shows, for example a show mentioned at 942 from among the list of shows in the screen shot 940. Upon selection, the selected movie and show details may be appended with the user input (for example, the message on the screen shot 910). The user may include names of one or more friends who are intended recipients of the message in the window 906 (in the screen shot 910), and send the message.

In one scenario, while user is texting/typing using a keyboard across the editor and if the user has clicked on an advertisement displayed after entering a query on a search engine, and thereafter, if the user has entered the same query in a second search engine, the same advertisement is not displayed in the top position at the second search engine, as the two search engines are not integrated. However, in accordance with aspects of the present invention the information on what user is typing using a keyboard is gathered and the advertisement is provided irrespective of browser/IM applications/search engines being used by the user. For example, if the user is typing a word and taps on an advertisement (which was provided on suggestion bar on the basis of what user has typed) while using an IM/browser and, next time, the same advertisement may be provided first even though the user is using a different browser/IM/search engine and also the word/context may be mapped with multiple advertisers information.

In another exemplary scenario, instead of sending message to other users, for example, as is done in the example explained with reference to FIG. 9, the user may only wish to determine/identify contextually relevant advertisements/services. One such example scenario is described with reference to FIG. 10.

Figure 10:
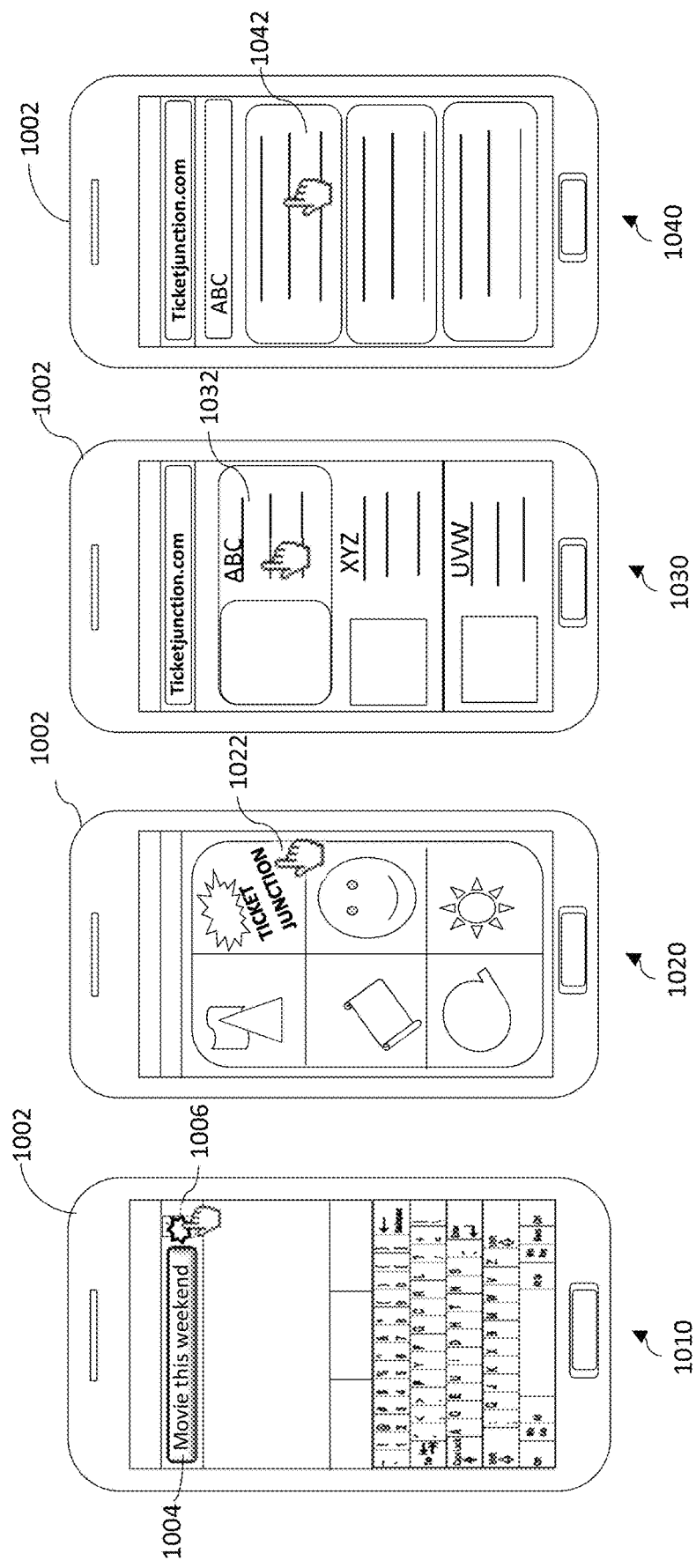
FIG. 10 illustrates a series of screen shots of an exemplary contextual discovery application displaying exemplary graphical user interface in accordance with still another embodiment.

FIG. 10 illustrates a series of screen shots 1010, 1020, 1030, 1040 of yet another exemplary contextual discovery application displaying exemplary graphical user interface windows displayable on a smartphone or other computing device as part of the application shown for illustrative purposes. In the present example, a user may access a widget for contextual discovery application on a computing device 1002, and provide a user input in a user input portion 1004 associated with the widget. As illustrated in the screen shot 1010, the user may provide the user input such as 'movie this weekend' to determine contextually relevant advertisement/services. Upon entering the user input, when the user may provide a user action such as by tapping the contextual discovery key 1006 on the UI, the discovery key 1006 may be illuminated, thereby notifying identification of information such as advertisements/services contextually relevant to the user input. It is to be noted that for initiating the contextual discovery application on the computing device, the user action may include various other actions apart from tapping a key such as providing a user gesture, an audio gesture, and the like.

As illustrated in the screen shot 1020, the UI may present a list/grid of contextually relevant advertisements/services to the user, thereby allowing the user to select one of the many websites from the list on the screen. The user may select one of the websites such as website 1022 by means of a user action, for example by tapping on an icon of said website on the screen of the UI. Upon provisioning of the user action, the UI may present detailed information of various movies such as movies ABC, XYZ, UVW, and the like on the selected website (for example ticketjunction. com), as illustrated in the screen shot 1030. The user may select one of the movies, for example, the movie ABC by performing a user action, for example at 1032.

The subsequent screen shot 1040 may display a list of movie shows for the movie ABC at various theaters, cinemas, and the like along with movie show details, such as timings, movie reviews, availability of tickets, and the like. The user may select one of the shows from the list displayed in the screen shot 1040, for example, a show listed at 1042, and proceed with subsequent transactions.

Figure 11:
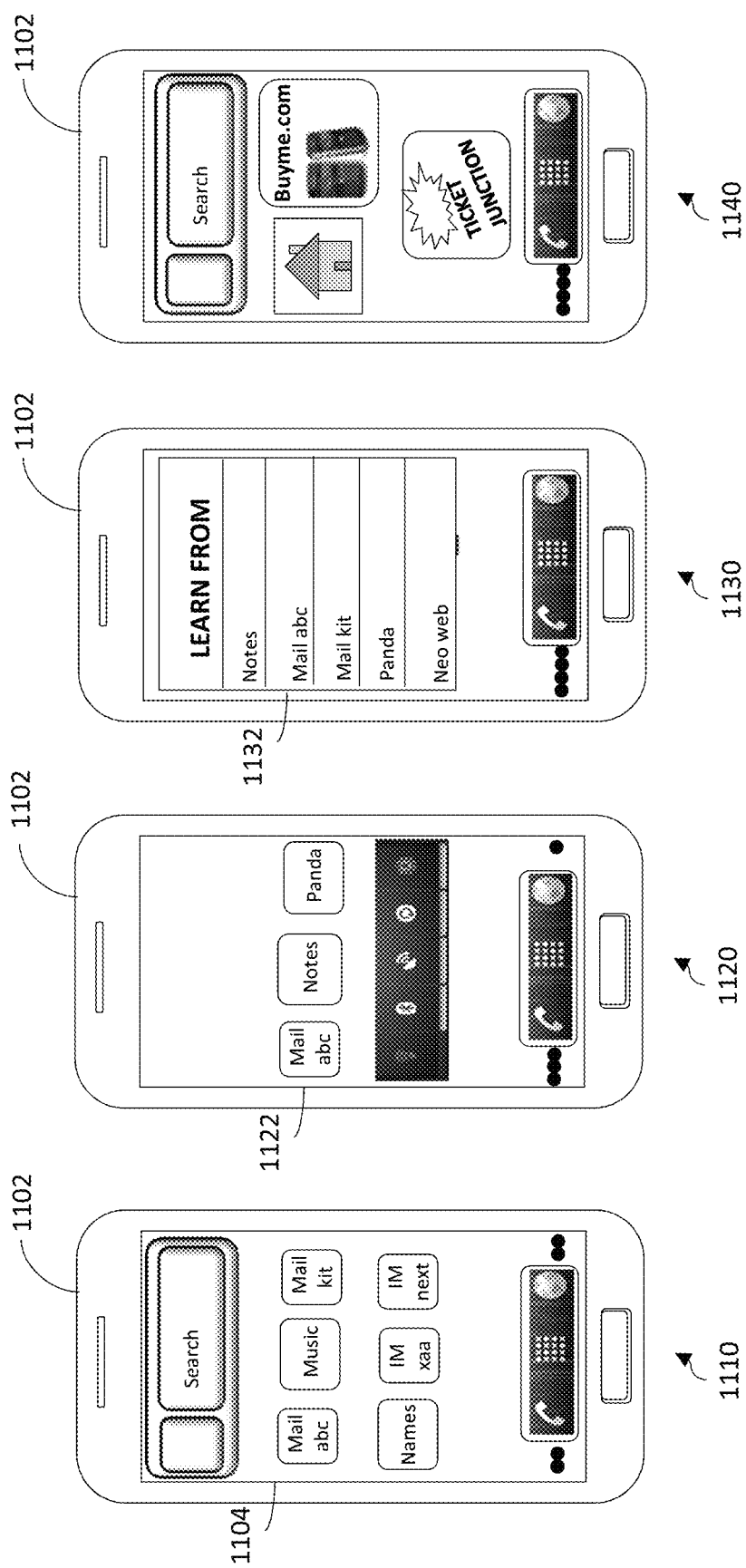
FIG. 11 illustrates a series of screen shots of an exemplary contextual discovery application displaying exemplary graphical user interface in accordance with still another embodiment.

FIG. 11 illustrates a series of screen shots 1110, 1120, 1130, 1140 of yet another exemplary contextual discovery application displaying exemplary graphical user interface windows displayable on a smartphone or other computing device as part of the application shown for illustrative purposes. In the present example, a user may access a home-screen for contextual discovery application on a computing device 1102. The computing device 1102 may be configured to present one or more home-screens. For example, Referring to FIG. 11, a home-screen 1104 is illustrated. Similar to a typical home-screen, the home-screen 1104 provides various options to the user to access various applications, such as mails, contacts, music and the like on the computing device. The user may access subsequent home-screen, for example, a home screen 1122 illustrated in the screen shot 1120. In an embodiment, the user may access subsequent home-screens by performing a user action, such as a slide action on the current home-screen.

As disclosed herein, one of the home-screen of the one or more home-screens may be a contextual home-screen. In an embodiment, at first login by a user, the user may be prompted to make the context more personal by giving the contextual discovery system/application an access to various sources on or outside the computing device 1102. For example, as illustrated in FIG. 11, the screen-shot 1130 is shown to include a home-screen 1132 showing various user sources that may be accessed by the contextual discovery application/system for determining user information. Various examples of sources on the computing device or outside the computing device may include but are not limited to public profiles or private profile requiring user login such as files, social networking web-sites profiles, user's profiles and accounts, user download, accounts, content being accessed by the user on or outside the computing device, and the like. It will be noted that herein sources present outside the computing device may include, for example, reading from a mail account from a browser which is not a source on the computing device, and other such sources. Upon learning about user resources, the contextual discovery application/system (for example, systems 300/400/500) may update the database (for example, the memory module of the computing device) with user profiling information, thereby connecting the dots on the user profile, user's preferences, usage patterns of different keywords of relevance to the contextual discovery system/application for which it can display contextual services.

In an exemplary scenario, the user's social networking profile learning may facilitate the contextual discovery system/application gain valuable insights such as user's interests in trekking on weekends. Accordingly, as per the teachings of the present invention, the contextual home-screen can display advertisements from trekking organizers or advertisements from hiking gear shops, when weekend is approaching. In another example, the user's communication (by way of SMS/email etc.) may provide learning to the contextual discovery system/application regarding user's plan for a movie on the coming weekend. Then, the contextual discovery system/application may populate the contextual discovery home-screen, for example the contextual home-screen 1140 with movie show booking web-sites, movies review web-sites and other information that may be relevant for user's plan for movie on the weekend.

In an embodiment, the contextual home-screen may exist without any other component required for user input, such as a keyboard. In an embodiment, the contextual discovery home-screen may provide a setting for enabling the contextual home-screen based on user preferences. For example, said setting may allow facilitate in pushing the advertisements dynamically on the computing device based on a learning of user's preferences. In an alternate embodiment, said settings may enable the contextual home-screen only upon user launching the home-screen. In yet another embodiment, said setting may enable the contextual home-screen in the computing device when user initiates a fetch from a specific event.

In certain embodiments, the contextual home-screen services can be deleted by the user. Also, in case the user wishes to view the details of a service, then the user can revert back to the same home-screen view by, for example, swiping the home-screen view on the computing device. In an example embodiment, the contextual home-screen may allow the user to lock one or more specific services/advertisements for viewing all the time as per user preferences on the UI of the computing device. For example, the contextual home-screen may provide an option on the UI to display advertisements on movies being released by Disney.

In certain embodiments, the contextual home-screen may be configured to facilitate subscription for information on the websites being visited by the user on the computing device. In alternate embodiments, the contextual home-screen may be configured to provide a plugin on a browser or subscribe for content being consumed on the device like application, user searches, and the like. It can also get an access to the content being typed by the user through a subscribe mechanism or by being the default text input application. Said information/data may be used to decide the contextual serving of advertisements/services. For example, if a user just visited messaging application and sent a message out to his friend saying "How about a movie this weekend", and subsequently when the user opens the home-screen within an identified time interval (may be until the next weekend), an advertisement may be served to the user by a movie ticket booking portal.

It is noted that the UIs explained herein with reference to FIGS. 6 to 11 are for illustration purposes and that the computing device may be configured to provide contextually relevant advertisements/services based on the user input without limiting to the user input scenarios disclosed in FIGS. 6 to 11. Also, the user interface is explained to include a contextual discovery key that may change state thereof from an invisible state to a visible state based on a user action. Additionally or alternatively, the contextual discovery key may change state thereof without user initiated action based only on the presence of contextually relevant information. One of the examples of the contextual discovery key may include an image of a star that can present a visual notification upon identification of the contextually relevant information. Other examples of change in visible keys state may include change in size from small to big, change in color of the contextual discovery key, change in background, change in the image on the contextual discovery key, haptic or tactile feedback, depth of the contextual discovery key, visual feedback, and other such user perceivable indications. It will be appreciated that in certain other embodiments, the notification may be provided by means other than visual means such as audio means, vibration means, user gesture means and the like without limiting the scope of the present disclosure. In an alternate embodiment, the said key is also provided anywhere on the screen like a blob if the software is integrated into other IMs as a plug-in or a source code.

Further, the contextual discovery application may be accessed in any application/editor of a computing device, for example, in email, SMS, notes, IM and the like. In certain embodiments, the application may be accessed while the user is providing the user input (for example, while typing) or upon the user has provided a user action (such as by tapping the contextual discovery key key) subsequent to the provisioning of the user input. It will also be appreciated that the context of the user input may be determined by, among other things, a location context, time context and the like in the message.

Various embodiments may provide methods and systems for contextual discovery applications in computing devices. The contextual discovery methods may include provisioning of components for facilitating contextual discovery such as the components of contextual discovery systems 300/400/500. The contextual discovery methods may include retrieving data from advertisers and operators, and providing said data to be stored in the computing device in a predetermined format. When a user provides a user input in a computing device, the context of the user input may be analyzed, and relevant data from the stored data may be provided to the user.

The above described various embodiments may be modified into many more alternative embodiments. It is to be noted that the contextual discovery systems and methods, as described in various embodiments, are not limited to the exemplary configuration as described with respect to FIGS. 2 to 11, but, these may be configured in a multitude of configurations. The contextual discovery application/systems can work as a background component (such as a plugin, etc.) for different applications, search engines, and the like. In various embodiments, the contextual discovery application/systems can be installed by the user or may be preloaded on a device from the OEM/Operator stable. Additionally, the contextual discovery application/systems can work with a keyboard to enable regular text prediction with context information and learning as the user is providing the user input (for example, by way of typing). In certain embodiments, the contextual discovery application/systems may operate with a keyboard where no other component exists with it. The keyboard may comprise a contextual discovery key to let the user select the display of contextual services while providing the user input (for example, by way of typing).

Users may utilize the contextual systems and methods for determining advertisements and/or service relevant to the context of a user input in real-time. In various implementations, the contextual discovery systems and methods may enable the users to determine contextually relevant data/information quickly, directly and with one tap of a key. Selecting a service and/or advertisement can lead the user to more refined results displayed in a more application friendly way or directly take the user to a relevant or related webpage.

In certain example embodiments, the contextual discovery system may be implemented for provisioning of various application such as contextual discovery home-screen (explained with reference to FIG. 11), a contextual discovery key, contextual discovery widget (explained with reference to FIG. 7), a contextual discovery API, and the like. As disclosed herein, the contextual discovery API may also facilitate for third party integration wherein the context associations, frequency of usage, user profile, user preferences, the word attributes, and the like may be provided. For example, a search engine may be communicably coupled to the contextual discovery system to retrieve inputs on the keywords or related keywords identified for searching. Examples of such inputs may include the context of usage of such words, the topics that those words fall into, the user's interest in those topics, the applications within which the words are used, the time of day when the word are used, the frequency of usage of those words, the learning of usage of those words in the users sources like social networking websites, blogs, emails, and the like.

The invention takes care of scenarios where multiple advertisements relate to the same contextual information, the advertisements are displayed on the display unit according to at least one of a computing device ranking and a server ranking. The computing device ranking is based on the set of information, and the server ranking is based on at least one of a form data filled out by a category of user while uploading the advertisement, and analytic information which is collected by the processing unit.

The server side ranking can be performed using the below formula:

$$R_{server} = w_1 * f_1 + w_2 * f_2 + w_3 * f_3 + w_4 * f_4 + \ldots \quad (1)$$

Where $W_i$ are the weights for each factor $f_i$ and
$f_1$—is calculated based on advertiser history
$f_2$—is calculated based on user demographics
$f_3$—is calculated based on location demographics
$f_4$—is calculated based pricing
and the summation of all the parameters, not limited as mentioned above, (including their weights) of server side can be included in the same formula to assign a server rank. Computing device ranking can be performed using the below formula:

$$R_{server} = w_1 * f_1 + w_2 * f_2 + w_3 * f_3 + w_4 * f_4 + w_5 * f_5 + \ldots \quad (2)$$

Where $W_i$ are the weights for each factor $f_i$ and
$f_1$—is calculated based on Current Keyword/context/phrase
$f_2$—is calculated based on the ad clicks/ad impressions
$f_3$—is calculated based on user current location
$f_4$—is calculated based on user entering text at a particular time/day
$f_5$—is calculated based display location and the summation of all the parameters, not limited as mentioned above, (including their weights) of client side can be included in the same formula to assign a client rank.

The contextual discovery systems and methods provide more opportunities to the advertisers and operators to engage the customer in real time. For example, the contextual discovery systems and methods facilitate provisioning of a movie service when the user is chatting with a friend about a movie, a gift service when there is a discussion amongst friends gifting someone for their birthday or marriage, a taxi service when a user is typing search keywords for a location, and other such scenarios. Additionally, the contextual discovery systems and methods preclude the need to spend time to install individual applications on the computing device to get the same information. Moreover, the disclosed systems and methods provide the user the service when needed in real time based on a user initiation (for example, when the user performs a user action to initiate the contextual discovery key), or alternately without user-initiation. Another example of real time engagement between the customer and the advertisers and operators can be a scenario when the customer is in "Café Coffee Day™" in some location. He starts typing on a client device powered with contextual discovery application "Deal" or "offers". The system intelligently identifies that the user should be offered any "Café Coffee Day™" deals/coupons that can be availed at that specific "Café Coffee Day™" outlet. The user's current location, the advertiser's proximity, the deal available, etc. may be used to help give this hyper contextual discovery service to the user. If no deal is available, the client device notifies the server that a customer was looking for a deal at particular outlet in a particular location and this information across many such users may be collated and presented to the advertiser as an intelligent API for the advertiser to plan his deal campaign better. Additionally, other analytics may augment this feature.

As discussed with reference to FIGS. 2 to 11, the contextual discovery system may be implemented in various ways to achieve contextual discovery in computing devices. For example, in one embodiment, the contextual discovery system may be implemented so as to utilize information that is profiled about the user by using the learning and contextual input engine alongside the contextual discovery system. For example, such a contextual discovery system may be implemented in a contextual discovery widget (explained with reference to FIG. 7), a contextual discovery home-screen (explained with reference to FIG. 11), and a contextual discovery key. In certain other embodiments, the contextual discovery system may perform contextual discovery without the information being accessible from the related input system of the contextual discovery system. Such a system may be implemented in a contextual discovery widget (explained with reference to FIG. 7), a contextual discovery home-screen (explained with reference to FIG. 11).

In one embodiment, the application serves advertisements by identifying the words being typed, context being typed, information stored on user's device, previous location of the user, current location of the user, advertiser who bought the word with more cost (for joint ownership of words), and user's frequent selection. For example, if the user has typed "shall we buy shoes today from 'Website X'" and the words 'buy', 'shoes' may be bought by more than one advertiser and if the words 'shoes' and 'today' may be bought by a second advertiser and the words 'shoes' and 'Website X' may be bought by third advertiser (here, the word 'shoes' is a word that is bought by more than one advertiser). In this case, if the user has typed "shall we buy", and the shoes/'Website X' hasn't typed yet, the software provides 'Website Y'/'Website X'/any other e-commerce site on the suggestion bar or at grid 1 by considering several factors like first advertiser to buy, advertiser who bought the word at high price, the advertiser who bought only rights for providing the advertisements for a word/phrase/context only on suggestion bar, the advertiser who bought only rights for providing the advertisements word/phrase/context only for grid 1, the advertiser who bought rights for providing advertisements word/phrase/context on both suggestion bar and at grid level, previous user entry in any browser/widget, data being typed across the editor, location of the user, data obtained from the device, user's personal information (which can be identified at the time of installation of software). If the user continues to type "shall we buy shoes from Website X", the software again performs the same process to identify relevant advertisements which may/may not be similar to the previous advertisements as this time, the context has changed and the software also considers time of this particular context to provide suitable advertisements.

In the above example, the factors like the first advertiser to buy, the advertiser who bought the word at high price, the advertiser who bought only rights for providing the advertisements only on suggestion bar, the advertiser who bought only rights for providing the advertisements only for grid 1, the advertiser who bought rights for providing advertisements on both suggestion bar and at grid level, frequent selection of an ad from suggestion bar/grid 1/grid 1, and advertiser who bought rights for a particular word/context/phrase/temporal words (described in point 6 in the document) may be considered at the advertiser end and a rank is assigned to each advertiser by considering all these elements from the advertiser end and provides an ad that has a top rank on suggestion bar/grid 1/grid 2 based on context/location and time the user has entered the text.

The analytics also considers factors like CPC (click per cost), CPA (cost per actions), CPM (cost per impression (on suggestion bar)) and CPS (cost per sale).

In an embodiment, the server receives at least the information used to identify contextual information, the contextual information, and analytics from one or more client processors and process at least one of them to identify a current trending context related to a trend among users of the client processors. The server can also predict trending context probable to be occurring in a later time based on at least one of the information used to identify contextual information, the contextual information, and analytics. The trends can be as follows:

The top searched words in a location obtained from the data being typed by users across multiple search apps on the mobile client.

Age based trends

Time based trends when the set of information and/or contextual information were processed at the client processor Seasonal trends Brands based trends, for example number of users in certain age group are discussing a certain brand App based trends, like number of users are actively typing more than 1000 words per day in IM apps Language Trends like language writing score across users in a region Number of users like a specific brand displayed on the display or what a user has put it in favorites.

Number of users in an age group in a region or across all regions who like a particular brand video shown in Grid2/Brand tile Number of users say positive things about a brand name in a region Given an event, like FIFA2015, how many users are looking for deals, discounts, happy hours, and so forth.

Location of the computing devices

Personal user demographics based trends

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

What is claimed is:

1. A user device comprising:
a user interface to receive user information from a user based on interactions with a plurality of applications including at least a contextual discovery application running on a user device which enables user control by providing a contextual discovery key on the user interface to receive a user input, wherein the user interface is one of a keypad displayed on a display, and a keyboard and wherein a default state of the contextual discovery key is an off-state, when the contextual discovery key is in an on-state, the user interface is configured to gather and store locally in the user device, keyword data from user's interactions with the plurality of applications;
a memory to store machine readable instructions comprised in the plurality of applications; and
a processor configured to access the memory and execute the machine readable instructions, when the contextual discovery key is in the on-state, the machine readable instructions causes the processor to:
monitor each of the plurality of applications to capture the user information from the user during the interactions with each of the plurality of applications gather and store in the memory at least one keyword data associated with one or more content providers prior to receiving the user information or while receiving the user information at the user interface, wherein the user information comprises text information inputted within any of the plurality of applications;
analyze at least one keyword data to identify a subset of keyword data based on the user information captured from the user during the interactions with each of the plurality of applications, and further based on one or more of: a given time at which the user information is captured, a type of application that the user is interacting with while the user information is being captured at the different instances of time, prior captured user information, one or more user preferences associated with the user device or an application of the plurality of applications, and content data generated by the plurality of applications;
communicate with a remote content server to receive retrieved content data associated with the one or more content providers based on the identified subset of keyword data; and
generate display data comprising the content data for display on a display of the user device for the user, notification data, the notification data being displayed on the display for the user while user is forward typing in a given application of the plurality of applications and wherein the content data is displayed on the display while the user is entering text at the user interface in one or more of the plurality of applications, wherein the display displays the retrieved content data associated with the one or more content providers based on a ranking scheme of metadata information rendered by the user device and one or more of the plurality of applications.

2. The user device of claim 1, wherein the plurality of applications comprise one of a short message service application, an email, and a combination thereof.

3. The user device of claim 1, wherein the ranking scheme is defined according to ranking criteria associated with the one or more content providers.

4. The user device of claim 3, wherein the ranking scheme controls an order of display of the retrieved content data on the display.

5. The user device of claim 1, wherein the display is configured to display the retrieved content associated with the one or more content providers based on one of temporal information, a geographic location, and a combination thereof of the user device.

6. The user device of claim 1, wherein the one or more content providers corresponds to one or more advertisers, and the content is one or more advertisements.

7. The user device of claim 1, wherein the user device is one of a computer, a tablet and a mobile device.

8. The user device of claim 1, wherein the plurality of applications comprise one of email client, a chat client, a web page, a widget, a search engine or an applet, and the mobile application is any of a home-screen, a web browser, an email client, a chat client, a web page, and an applet.

9. The user device of claim 1, wherein the retrieved content data comprises brand experience data.

10. The user device of claim 9, wherein the processor is configured to receive updated brand experience data from the remote content server based on one or more parameters associated with the one or more content providers.

11. The user device of claim 1, wherein the at least one keyword data comprises one or more words.

12. The user device of claim 11, wherein the one or more words are categorized according to one or more topics.

13. The user device of claim 12, wherein the machine readable instructions further comprise a search engine configured to retrieve inputs on one or more words or related words identified for searching.

14. The user device of claim 13, wherein the inputs comprise a context of usage of such words, topics that those words fall into, user's interest in those topics, the plurality of applications within which the words are used, a time of day when the words are used, a frequency of usage of those words, and a learning of usage of those words in users sources.

15. A user device comprising:
a user interface configured to receive user information from a user based on interactions with a plurality of applications including at least a contextual discovery application running on a user device which enables user control by providing a contextual discovery key on the user interface to receive a user input, wherein the user interface is one of a keypad displayed on a display, and a keyboard and wherein a default state of the context discovery key is an off-state, when the contextual discovery key is in an on-state, the user interface is configured to gather and store locally in the user device, keyword data from user's interactions with the plurality of applications;

a memory to store machine readable instructions comprised in the plurality of applications;

a processor configured to access the memory and execute the machine readable instructions, when the contextual discovery key is in an on-state the selected option, the machine readable instructions causes the processor to:

monitor each of the plurality of applications to capture the user information from the user during the interactions with each of the plurality of applications by selecting the option to gather and store in the memory at least one keyword data associated with one or more content providers prior to receiving the user information or while receiving the user information at the user interface, wherein the user information comprises text information inputted within any of the plurality of applications;

analyze the at least one keyword data to identify a subset of keyword data based on the user information captured at the different instances of time from the user during the interactions with each of the plurality of applications, and further based on one or more of: a given time at which the user information is captured, a type of application that the user is interacting with while the user information is being captured, prior captured user information, one or more user preferences associated with the user device or an application of the plurality of applications, and content data generated by the plurality of applications;

communicate with an advertisement server to receive retrieved advertisement data associated with the one or more advertisement providers based on the identified subset of keyword data;

generate display data comprising the advertisement data for display on a display of the user device for the user, notification data, the notification data being displayed on the display for the user while user is forward typing in a given application of the plurality of applications and wherein the display displays the retrieved advertisement data associated with the one or more content providers based on a ranking scheme of metadata information rendered by the user device and one or more of the plurality of applications.

16. The user device of claim 15, wherein the plurality of applications comprise one of email client, a chat client, a web page, a widget, a search engine or an applet, and a mobile application, wherein the mobile application is one of a home-screen, a web browser, an email client, a chat client, a web page, and an applet.

17. The user device of claim 15, wherein the machine readable instructions correspond to a contextual discovery application, the contextual discovery application being integrated as a plug-in into one of a web application, a mobile application, a desktop application, a home-screen application, and a widget application.

18. The user device of claim 15, wherein the processor is configured to cause the display to render a visual element indicative of the keyword data.

19. The user device of claim 18, wherein the processor is configured to receive user information indicative of a selection of the visual element and cause the display to render the display data for viewing by the user.

20. A user device comprising:

a user interface configured to receive user information from a user based on interactions with a plurality of applications at different instances of time, wherein the user interface is one of a keypad displayed on a display, and a keyboard and wherein the user information comprises a first and a second set of information including at least a contextual discovery application running on a user device which enables user control by providing a contextual discovery key on the user interface to receive a user input, wherein the user information comprises text information inputted within any of the plurality of applications and wherein a default state of the context discovery key is, when set to an on-state, the user interface is configured to gather and store locally in the user device, keyword data from user's interactions with the plurality of applications;

a memory to store machine readable instructions comprised in the plurality of applications; and a processor configured to access the memory and execute the machine readable instructions, when the contextual discovery key is in an on-state, the machine readable instructions causes the processor to:

monitor each of the plurality of applications to capture the first set of user information while the user is interacting with a given application of a plurality of applications and the second set of user information while the user is interacting with another application of a plurality of applications, wherein the first and the second set of information are captured at the different instances of time and wherein the monitoring is carried out gather and store in the memory at least one keyword data associated with one or more content providers prior to receiving the user information or while receiving the user information at the user interface;

analyze the at least one keyword data to identify a subset of keyword data based on the first set of user information and further based on the second set of user information;

request and receive retrieved content data associated with the one or more content providers from a remote content server based on the identified subset of keyword data; and generate display data comprising the content data for display on a display of the user device for the user, notification data, the notification data being displayed on the display for the user while user is forward typing in a given application of the plurality of applications and wherein the display displays the retrieved content data associated with the one or more content providers based on a ranking scheme on metadata information rendered by the user device and one or more applications.

21. The user device, of claim 1, wherein the user interface is a keyboard.

* * * * *